(12) United States Patent
Kimura et al.

(10) Patent No.: US 11,330,209 B2
(45) Date of Patent: May 10, 2022

(54) IMAGING DEVICE AND ELECTRONIC DEVICE ENABLED TO CONTROL POSITION OF LENS

(71) Applicant: SONY SEMICONDUCTOR SOLUTIONS CORPORATION, Kanagawa (JP)

(72) Inventors: Katsuji Kimura, Kanagawa (JP); Rei Takamori, Kumamoto (JP); Hirokazu Seki, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/040,046

(22) PCT Filed: Mar. 15, 2019

(86) PCT No.: PCT/JP2019/010755
§ 371 (c)(1),
(2) Date: Sep. 21, 2020

(87) PCT Pub. No.: WO2019/188387
PCT Pub. Date: Oct. 3, 2019

(65) Prior Publication Data
US 2021/0021771 A1   Jan. 21, 2021

(30) Foreign Application Priority Data

Mar. 29, 2018 (JP) .............................. JP2018-063752
Jul. 18, 2018 (JP) .............................. JP2018-134734

(51) Int. Cl.
*H04N 5/357* (2011.01)
*G02B 7/09* (2021.01)
(Continued)

(52) U.S. Cl.
CPC .............. *H04N 5/3577* (2013.01); *G02B 7/09* (2013.01); *G02B 27/646* (2013.01); *G03B 5/00* (2013.01);
(Continued)

(58) Field of Classification Search
CPC ............. H04N 5/3577; H04N 5/23287; H04N 5/2253; H02K 11/225; H02K 41/0356;
(Continued)

(56) References Cited

U.S. PATENT DOCUMENTS

2005/0122401 A1   6/2005   Horie
2010/0253825 A1   10/2010   Horie
(Continued)

FOREIGN PATENT DOCUMENTS

CN   1607453 A   4/2005
CN   101082753 A   12/2007
(Continued)

OTHER PUBLICATIONS

International Search Report and Written Opinion of PCT Application No. PCT/JP2019/010755, dated May 7, 2019, 11 pages of ISRWO.

(Continued)

*Primary Examiner* — Padma Haliyur
(74) *Attorney, Agent, or Firm* — Chip Law Group

(57) ABSTRACT

The present technology relates to an imaging device and an electronic device that enable highly accurate adjustment of a focus position and a camera shake correction position. The device includes: a lens that focuses subject light; an imaging element that photoelectrically converts the subject light from the lens; a circuit substrate including a circuit that externally outputs a signal from the imaging element; an actuator that drives the lens with a Pulse Width Modulation (PWM) waveform in at least one of an X-axis direction, a Y-axis (Continued)

direction, or a Z-axis direction; and a detection unit that detects a magnetic field generated by a coil included in the actuator. The actuator drives the lens to move a focus, or drives the lens to reduce an influence of camera shake. The present technology can be applied to the imaging device.

11 Claims, 30 Drawing Sheets

(51) Int. Cl.
| | | |
|---|---|---|
| *H02K 11/225* | (2016.01) | |
| *H02P 7/025* | (2016.01) | |
| *G02B 27/64* | (2006.01) | |
| *G03B 5/00* | (2021.01) | |
| *G03B 13/36* | (2021.01) | |
| *H02K 41/035* | (2006.01) | |
| *H02P 6/00* | (2016.01) | |
| *H02P 6/16* | (2016.01) | |

(52) U.S. Cl.
CPC ........... *G03B 13/36* (2013.01); *H02K 11/225* (2016.01); *H02K 41/0356* (2013.01); *H02P 6/006* (2013.01); *H02P 6/16* (2013.01); *H02P 7/025* (2016.02); *G03B 2205/0015* (2013.01); *G03B 2205/0023* (2013.01); *H02K 2201/18* (2013.01)

(58) Field of Classification Search
CPC ..... H02K 2201/18; H02P 7/025; H02P 6/006; H02P 6/16; H02P 6/182; G02B 7/09; G02B 27/646; G03B 5/00; G03B 13/36; G03B 2205/0015; G03B 2205/0023; G03B 2205/0069; G03B 3/10; G03B 30/00; G03B 2205/0007
See application file for complete search history.

(56) References Cited

U.S. PATENT DOCUMENTS

| | | |
|---|---|---|
| 2012/0062790 A1 | 3/2012 | Tazoe |
| 2014/0186017 A1 | 7/2014 | Shibata |
| 2015/0171128 A1 | 6/2015 | Ogata |
| 2015/0207983 A1 | 7/2015 | Kang et al. |
| 2016/0178923 A1* | 6/2016 | Hayashi ............... G02B 27/646 359/557 |
| 2017/0059810 A1 | 3/2017 | Kang et al. |
| 2017/0133423 A1 | 5/2017 | Ogata |
| 2017/0154910 A1 | 6/2017 | Ogata |
| 2018/0149881 A1* | 5/2018 | Kim .......................... G02B 7/09 |
| 2018/0288330 A1* | 10/2018 | Miyazawa ......... H04N 5/23258 |
| 2020/0049939 A1* | 2/2020 | Lee ........................... G02B 7/10 |

FOREIGN PATENT DOCUMENTS

| | | |
|---|---|---|
| CN | 101930150 A | 12/2010 |
| CN | 102401967 A | 4/2012 |
| CN | 104716149 A | 6/2015 |
| CN | 104937482 A | 9/2015 |
| EP | 3097452 A1 | 11/2016 |
| JP | 2000-295832 A | 10/2000 |
| JP | 2005-121838 A | 5/2005 |
| JP | 2007-151862 A | 6/2007 |
| JP | 2010-171770 A | 8/2010 |
| JP | 2011-022563 A | 2/2011 |
| JP | 2011-227428 A | 11/2011 |
| JP | 2012-058535 A | 3/2012 |
| JP | 2014-082682 A | 5/2014 |
| JP | 2014-126860 A | 7/2014 |
| JP | 2015-115522 A | 6/2015 |
| JP | 2015-197627 A | 11/2015 |
| JP | 2016-537665 A | 12/2016 |
| KR | 10-2015-0087611 A | 7/2015 |
| KR | 10-2015-0097998 A | 8/2015 |
| KR | 10-2017-0062196 A | 6/2017 |
| WO | 2015/111884 A1 | 7/2015 |
| WO | WO-2018016789 A1 * | 1/2018 ............... G03B 3/10 |

OTHER PUBLICATIONS

Office Action for CN Patent Application No. 201980021142.7, dated Aug. 13, 2021, 09 pages of English Translation and 09 pages of Office Action.

* cited by examiner

FIG. 14A           FIG. 14B           FIG. 14C           FIG. 14D
COIL 33a          COIL 33b          COIL 33c          COIL 33d
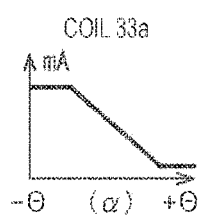 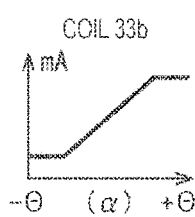 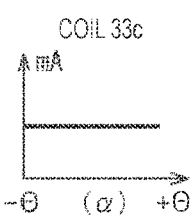 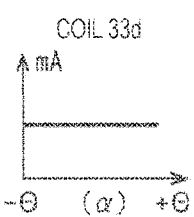
 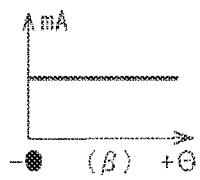 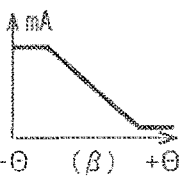 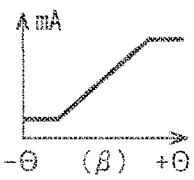

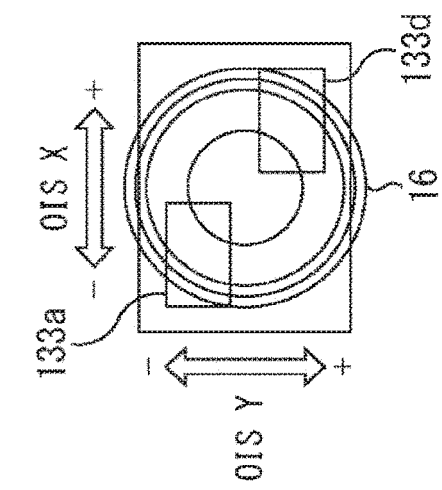
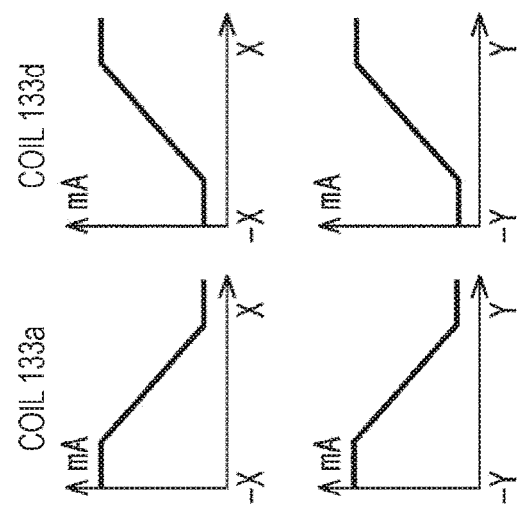

IMAGING DEVICE AND ELECTRONIC DEVICE ENABLED TO CONTROL POSITION OF LENS

CROSS REFERENCE TO RELATED APPLICATIONS

This application is a U.S. National Phase of International Patent Application No. PCT/JP2019/010755 filed on Mar. 15, 2019, which claims priority benefit of Japanese Patent Application No. JP 2018-134734 filed in the Japan Patent Office on Jul. 18, 2018 and also claims priority benefit of Japanese Patent Application No. JP 2018-063752 filed in the Japan Patent Office on Mar. 29, 2018. Each of the above-referenced applications is hereby incorporated herein by reference in its entirety.

TECHNICAL FIELD

The present technology relates to an imaging device and an electronic device, and for example, relates to an imaging device and an electronic device enabled to control a position of a lens with high accuracy.

BACKGROUND ART

In recent years, an increase in the number of pixels, high performance, and downsizing of imaging devices, for example, have been progressing. With the increase in the number of pixels and high performance of imaging devices, the power consumption has increased of imaging elements such as Charge-Coupled Device (CCD) sensors or Complementary Metal-Oxide-Semiconductor (CMOS) image sensors mounted in the imaging devices.

Furthermore, since the power consumption of the actuator or the like that drives the lens focus is also increasing, the power consumption of the imaging device also tends to increase.

To reduce the power consumption, a method has been devised in which a drive signal of the actuator is made into a Pulse Width Modulation (PWM) waveform to suppress the power consumption to about half. However, it is known that when the actuator is driven by PWM drive, a magnetic field is generated, which is a disturbance factor of the imaging element, and noise is mixed.

To reduce noise, it has been devised that the noise is reduced by synchronizing a drive waveform of the imaging element with an autofocus driver that generates a PWM signal, and outputting a PWM waveform in the dead zone during the drive time of the imaging element.

Furthermore, as one of the high performance in the imaging device, to constantly detect a focus position of the lens and quickly move the lens to a position where subject light is focused, it has also been devised that an element for position detection such as a Hall element is mounted in the actuator, and the position of the lens is externally output.

For example, in Patent Document 1, it has been devised that autofocus is implemented by changing a focus of a lens, by controlling a drive element (actuator) with a PWM signal from a focus drive circuit to drive the lens. Furthermore, in Patent Document 1, it has been devised that a Hall element is mounted for high-performance lens position detection.

In Patent Document 2, it has been devised that noise of an imaging element due to a magnetic field generated by driving an actuator by PWM drive is reduced by blocking (shielding) the magnetic field by including a metal plate.

In Patent Document 3, it has been devised that a position of the lens is detected with a PWM signal (AC signal), depending on electromotive force of a detection coil arranged to face excitation power. In this devise, it has been devised that the detection coil is installed on the side of the lens that moves, and position detection is performed from a phase of an electromotive current in parallel movement of an excitation coil and the detection coil.

CITATION LIST

Patent Document

Patent Document 1: Japanese Patent Application Laid-Open No. 2011-022563
Patent Document 2: Japanese Patent Application Laid-Open No. 2014-082682
Patent Document 3: Japanese Patent Application Laid-Open No. 2000-295832

SUMMARY OF THE INVENTION

Problems to be Solved by the Invention

According to Patent Document 1, it is necessary to mount the Hall element, and the actuator becomes large, which makes the downsizing difficult. Furthermore, since it is necessary to mount the Hall element, there is also a concern that the imaging device becomes expensive.

According to the cited document 2, since gold, silver, copper, aluminum, or the like is used for the metal plate for blocking the magnetic field, there is a concern that the imaging device becomes expensive. Furthermore, even if the metal plate for blocking the magnetic field is provided, it does not contribute to the downsizing of the imaging device.

Recent actuators each have a structure in which a coil is arranged outside the lens, the coil is moved to the side perpendicular to the imaging element depending on the excitation power, and focus detection is performed. When the cited document 3 is applied to such a structure, the excitation power coil and the detection coil are arranged to face each other, and the lens position cannot be detected by the parallel movement. That is, it is difficult to apply the cited document 3 to the recent actuators.

The present technology has been made in view of such a situation, and makes it possible to provide an imaging device capable of high performance, low power consumption, and downsizing.

Solutions to Problems

An imaging device of one aspect of the present technology includes: a lens that focuses subject light; an imaging element that photoelectrically converts the subject light from the lens; a circuit substrate including a circuit that externally outputs a signal from the imaging element; an actuator that drives the lens with a Pulse Width Modulation (PWM) waveform in at least one of an X-axis direction, a Y-axis direction, or a Z-axis direction; and a detection unit that detects a magnetic field generated by a coil included in the actuator.

An electronic device of one aspect of the present technology includes an imaging device that includes: a lens that focuses subject light; an imaging element that photoelectrically converts the subject light from the lens; a circuit substrate including a circuit that externally outputs a signal from the imaging element; an actuator that drives the lens with a Pulse Width Modulation (PWM) waveform in at least one of an X-axis direction, a Y-axis direction, or a Z-axis direction; and a detection unit that detects a magnetic field generated by a coil included in the actuator.

In the imaging device of one aspect of the present technology, the device includes: the imaging element that photoelectrically converts the subject light from the lens that focuses the subject light; the circuit substrate including the circuit that externally outputs the signal from the imaging element; and the actuator that drives the lens with the Pulse Width Modulation (PWM) waveform in at least one of the X-axis direction, the Y-axis direction, or the Z-axis direction, and the magnetic field generated by the coil included in the actuator is detected.

In the electronic device of one aspect of the present technology, the imaging device is included.

Note that, the imaging device and the electronic device each may be an independent device or an internal block included in one device.

Effects of the Invention

According to one aspect of the present technology, it is possible to provide an imaging device capable of high performance, low power consumption, and downsizing.

Note that, the effect described here is not necessarily limited, and can be any effect described in the present disclosure.

BRIEF DESCRIPTION OF DRAWINGS

FIGS. 14A, 14B, 14C, and 14D are diagrams for explaining induced electromotive force generated in each coil.

FIGS. 18A, 18B, and 18C are diagrams for explaining induced electromotive force generated in each coil.

MODE FOR CARRYING OUT THE INVENTION

The following is a description of a mode for carrying out the present technology (the mode will be hereinafter referred to as the embodiment).

<Configuration of Imaging Device>

The present technology can be applied to an imaging device including an imaging element such as a Charge-Coupled Device (CCD) sensor or a Complementary Metal-Oxide-Semiconductor (CMOS) image sensor. Furthermore, the present technology can also be applied to a device including such an imaging device, for example, a mobile terminal device, or the like.

Figure 1:
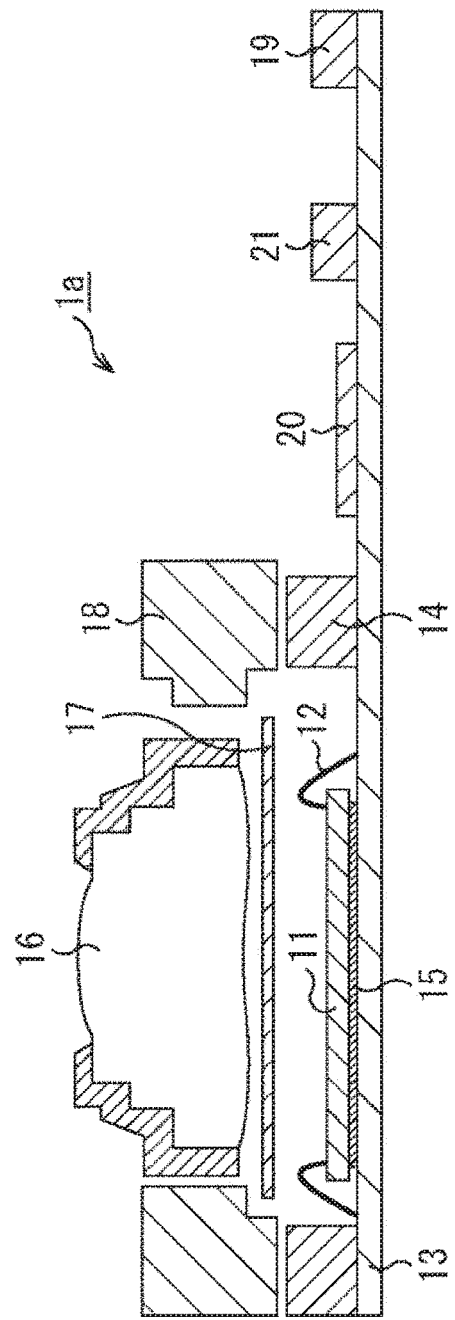
FIG. 1 is a diagram illustrating a configuration of an embodiment of an imaging device to which the present technology is applied.

FIG. 1 is a diagram illustrating a configuration of an embodiment of an imaging device of one aspect of the present technology. An imaging device 1a illustrated in FIG. 1 includes an imaging element 11 such as a CCD sensor or a CMOS image sensor that photoelectrically converts subject light from a subject to capture an image.

Furthermore, the imaging device 1a includes a lens 16 that focuses subject light, and an infrared cut filter 17 that blocks infrared light from an optical signal transmitted through the lens 16. Furthermore, the imaging device 1a also includes an actuator 18 that drives the lens up and down in a direction (hereinafter, appropriately described as Z-axis direction) to the imaging element 11 to adjust focus of the lens 16.

Furthermore, the actuator 18 also has a function of performing correction for reducing an influence of camera shake by driving the lens in a direction (hereinafter, appropriately described as an X-axis direction or a Y-axis direction) in a plane (hereinafter, appropriately described as an XY plane) horizontal to the imaging surface of the imaging element 11.

Furthermore, the imaging device 1a includes a gyro sensor 21 that senses the camera shake, an autofocus and OIS driver 20 for externally controlling the actuator 18, and a circuit board 13 for externally outputting an electric signal of the imaging element 11. Note that, although it is described as the circuit board 13 here, it may be a circuit substrate instead of a plate-like board.

OIS is an abbreviation for Optical Image Stabilizer, which means optical camera shake correction, and is a system in which an optical system processes correction for reducing the influence of the camera shake of the imaging device 1a. In the optical camera shake correction, vibrations at the time of imaging are sensed by the gyro sensor 21, and a position of the lens 16 is adjusted, or a position of the imaging element 11 is adjusted, to suppress the influence of the camera shake. Here, the description will be continued by citing an example in which camera shake correction is performed by adjusting the position of the lens 16.

The imaging device 1a includes a metal wire 12 for electrically connecting the imaging element 11 to the circuit board 13, an adhesive 15 for fixing the imaging element 11 to the circuit board 13, and also a spacer 14 for fixing the actuator 18 described above to the circuit board 13.

To reduce power consumed by the imaging device 1a, the autofocus and OIS driver 20 described above has a function of outputting a Pulse Width Modulation (PWM) waveform to the actuator 18. The actuator 18 has a function of driving the focus of the lens 16 with the input PWM waveform.

The circuit board 13 has a function of detecting induced electromotive force generated by a magnetic field generated from the PWM waveform, and a function of detecting the position of the lens 16 from the detected induced electromotive force. Furthermore, the circuit board 13 also has a function of implementing high-performance lens focus movement by externally outputting a detected result.

<Detection of Induced Electromotive Force>

Figure 2:
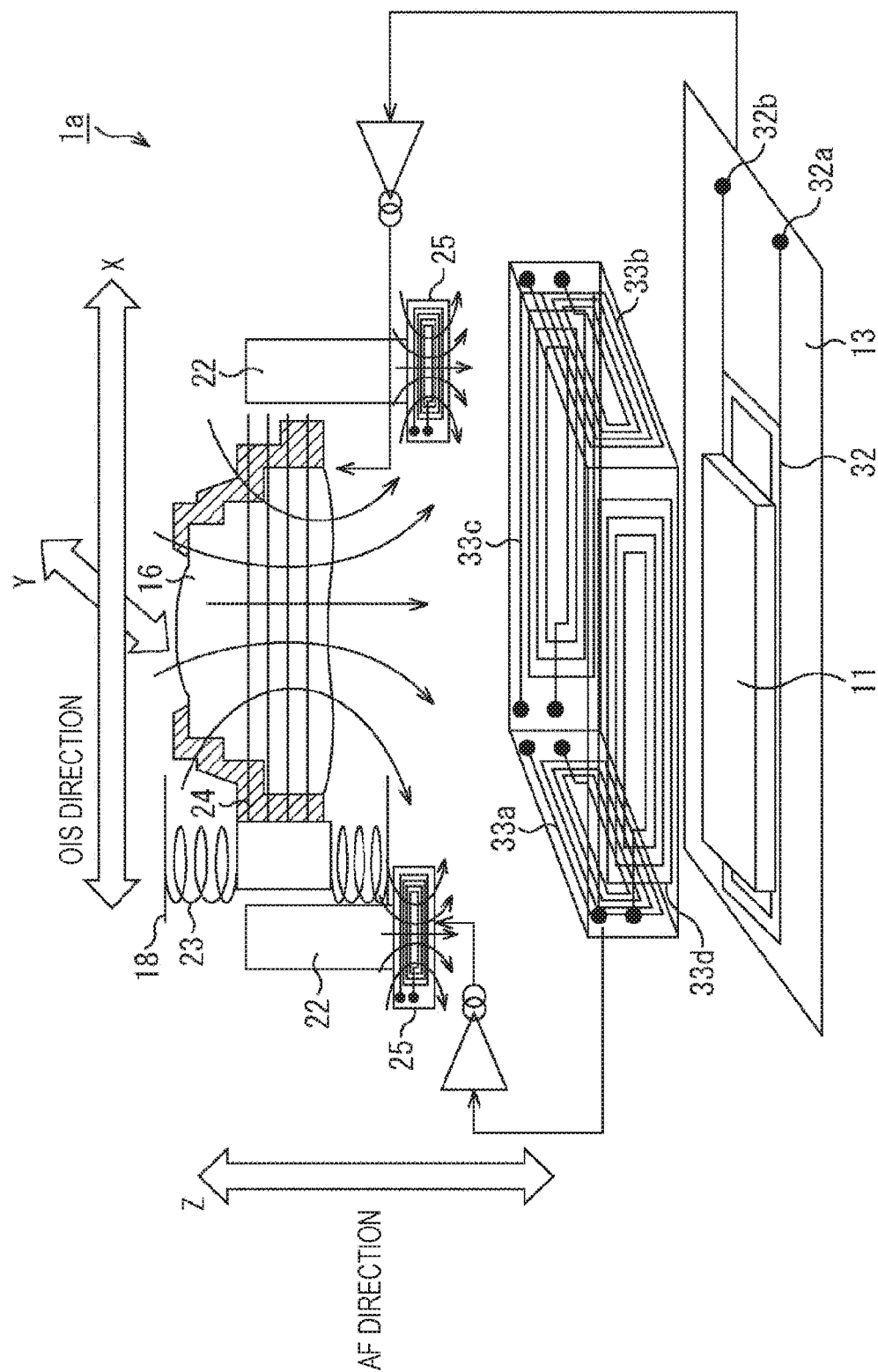
FIG. 2 is a diagram illustrating a detailed configuration example of the imaging device.

FIG. 2 is a diagram for explaining a magnetic field generated by a PWM waveform and induced electromotive force generated by the magnetic field, and is a diagram illustrating a detailed configuration example of the imaging device 1a.

The actuator 18 has a voice coil motor structure, and a coil 24 is supported by a spring 23 in the structure. For example, the coil 24 is provided on the side surface of a lens carrier, and a magnet 22 is provided on a side facing the coil 24.

When a current flows through the coil 24, force is generated in the vertical direction in the figure. The lens 16 held by a lens barrel is moved in the upward direction or the downward direction by the generated force, and a distance to the imaging element 11 changes. With such a mechanism, autofocus (AF) is implemented.

Furthermore, to drive the lens 16 on the same plane (XY plane) as the imaging element 11 for the camera shake correction, a fine pattern coil 25 (hereinafter, described as FP coil 25) is arranged. By causing a current to flow through the FP coil 25, force is generated in a direction horizontal to the imaging element 11 between the magnet 22 and the coil 25, and the lens 16 is moved in the same plane as the imaging element 11.

By the way, compared to a case where currents flowing through the coil 24 and the FP coil 25 each are a signal having a constant voltage value (a signal that maintains a Hi state at all times), power consumption can be reduced more in the case of a PWM waveform drive signal (a signal in which Hi and Low switch at a predetermined cycle) than in the case of the signal in which the Hi state continues.

Thus, in a case where the signals supplied to the coil 24 and the FP coil 25 are PWM waveform drive signals to reduce the power consumption, magnetic fields are respectively generated in directions illustrated in FIG. 2. Referring to FIG. 2, a magnetic field is generated in a direction from the lens 16 side toward the imaging element 11.

Note that, the magnetic field is generated in a direction different from the direction illustrated in FIG. 2 depending on the direction of the current, but here, the description will be continued taking a case where the magnetic field is generated in the direction illustrated in FIG. 2 as an example.

The generated magnetic field is transmitted through the imaging element 11. For this reason, an image captured by the imaging element 11 may be affected. For example, there is a possibility that noise is generated under an influence of the magnetic field and an image (image signal) on which the noise is mixed is output from the imaging element 11.

An influence of the noise from the magnetic field can be reduced by synchronizing signals of the PWM waveform drive and the imaging element 11 drive so that the magnetic field is not generated during a drive period in which the noise of the imaging element 11 is generated. By such synchronization, an image not affected by the magnetic field can be output from the imaging device 1a.

The magnetic field generated by supplying a PWM waveform drive signal to the coil 24 reaches also the circuit board 13. A description will be given of the function of detecting the position of the lens 16 by detecting the strength of the magnetic field reaching the circuit board 13.

Like the coil 24, the FP coil 25 also generates a magnetic field by being supplied with a PWM waveform drive signal, but the FP coil 25 has a smaller area and a smaller magnetic field strength than those of the coil 24. Here, the description will be continued taking a case where position detection of the lens 16 is performed by detecting the magnetic field generated by the coil 24 that generates a larger magnetic field than that by the FP coil 25 as an example.

As illustrated in FIG. 2, the circuit board 13 is provided with a coil 32. By providing the coil 32 in a direction perpendicular to the magnetic field generated by the PWM waveform drive, induced electromotive force is generated in the coil 32, and a position in the Z-axis direction of the lens 16 (lens holder) can be detected from the magnitude of the induced electromotive force.

Furthermore, the position of the lens 16 (lens holder) can be detected, in other words, a distance between the lens 16 and the imaging element 11 can be detected, whereby high-performance lens drive, that is, autofocus can be implemented.

Moreover, as illustrated in FIG. 2, coils 33a to 33d are provided on surfaces perpendicular to the imaging surface of the imaging element 11. Hereinafter, the coils 33a to 33d will be simply described as the coils 33 in a case where it is not necessary to individually distinguish the coils.

By providing the coils 33 at positions that are horizontal to the magnetic field generated by the PWM waveform drive, induced electromotive force is generated in each of the coils 33, and positions in the X-axis direction and the Y-axis direction of the lens 16 (lens holder) can be detected from the magnitude of the induced electromotive force.

The coils 33a to 33d are provided on four different surfaces, respectively. The coil 33a is provided on a surface that is perpendicular to the imaging surface of the imaging element 11 and is on the left side in FIG. 2. The coil 33b is provided on a surface that is perpendicular to the imaging surface of the imaging element 11 and is on the right side (a surface facing the surface on which the coil 33a is provided) in FIG. 2.

The coil 33c is provided on a surface that is perpendicular to the imaging surface of the imaging element 11 and is on the far side (a surface perpendicularly intersecting with the surface on which the coil 33a is provided) in FIG. 2. The coil 33d is provided on a surface that is perpendicular to the imaging surface of the imaging element 11 and is on the near side (a surface perpendicularly intersecting with the surface on which the coil 33a is provided, and facing the surface on which the coil 33c is provided) in FIG. 2.

As described above, by providing the coils 33 in the direction horizontal to the magnetic field generated by the PWM waveform drive, the induced electromotive force is generated in each of the coils 33, and the position in the X-axis direction and the position in the Y-axis direction (position in the XY plane) of the lens 16 (lens holder) can be detected from the magnitude of the induced electromotive force.

First, here, an example will be described in which the induced electromotive force for the position detection in a Z position direction of the lens 16 is detected, by mounting the coil 32 constituting a part of a detection circuit 31 (FIG. 6) on the circuit board 13 as illustrated in FIG. 2.

Figure 3B:
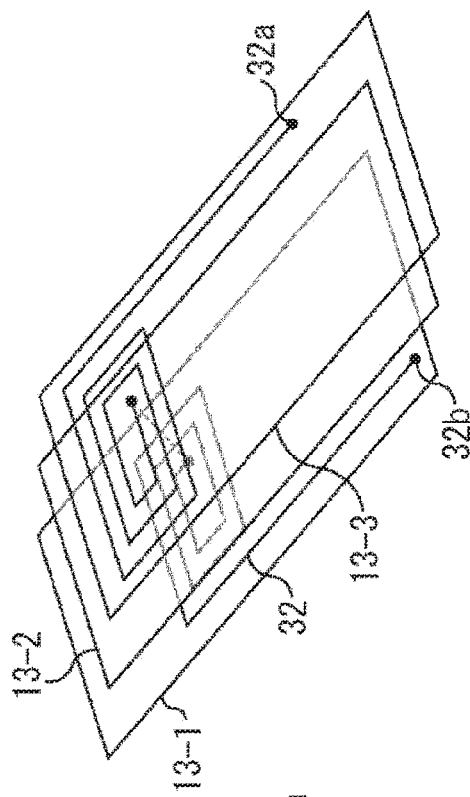
FIGS. 3A and 3B are diagrams for explaining a coil to be formed.
Figure 3A:
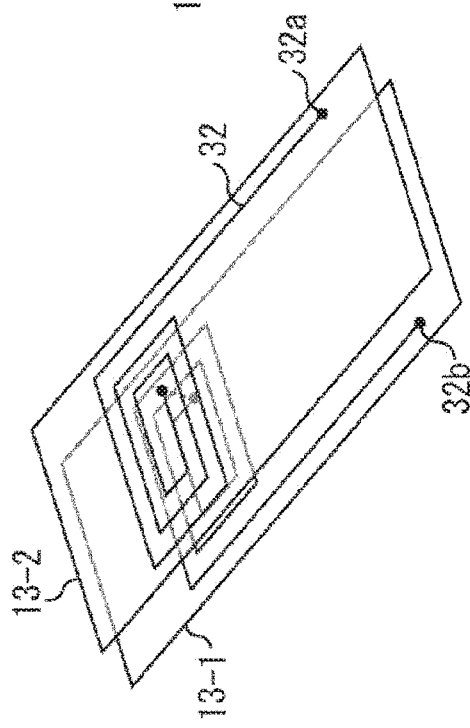

FIGS. 3A and 3B are diagrams illustrating a mounting example of the coil 32 mainly constituting the part of the detection circuit 31 in the Z-axis of the actuator onto the circuit board 13.

The coil 32 has a start point 32a and an end point 32b, and the start point 32a and the end point 32b are connected to the detection circuit 31 not illustrated in FIGS. 3A and 3B. In the coil 32, for a loop shape, and to make that the line does not have overlap, one of the start point 32a or the end point 32b is positioned inside the loop, and the other is positioned outside the loop.

Thus, considering that the start point 32a and the end point 32b are connected to the detection circuit 31, in other words, the lines are taken out respectively from the start point 32a and the end point 32b, the coil 32 needs to be formed across a plurality of layers.

FIG. 3A is referred to. Supposing a case where the circuit board 13 is formed in one layer, the start point 32a of the coil 32 is, for example, a point on the lower right side in the figure, and the end point is in a central portion of the coil 32 (illustrated by a black dot in FIG. 3A). In a case where the line is taken out from the end point in the central portion of the coil 32, it is difficult to take out the line so that there is no overlapping portion with the formed coil 32.

Thus, as illustrated in FIG. 3A, the circuit board 13 is formed including two layers. The circuit board 13 illustrated in FIG. 3A is formed including two layers of a circuit board 13-1 and a circuit board 13-2. The start point 32a of the coil 32 is formed on the circuit board 13-1, and the coil is formed in a loop shape from the outside toward the inside, from the start point 32a.

Furthermore, the end point of the coil 32 in the first layer is formed in the central portion of the coil 32 formed on the circuit board 13-1, and the start point of the coil 32 in the second layer is connected from the end point. On the circuit board 13-2 in the second layer, the coil 32 is formed in a loop shape from the inside toward the outside, from the start point.

The coil 32 in a loop shape is formed from the start point 32a formed on the circuit board 13-1 to the end point 32b formed on the circuit board 13-2. Furthermore, the start point 32a formed on the circuit board 13-1 and the end point 32b formed on the circuit board 13-2 can be used for connection to the detection circuit 31 not illustrated in FIG. 3A.

Note that, although not illustrated in FIG. 3A, a circuit and the like for externally outputting the electric signal from the imaging element 11 is formed in a portion other than a portion where the coil 32 is formed.

In the example illustrated in FIG. 3A, a case is illustrated where the circuit board 13 includes two layers, but the circuit board 13 may include three layers as illustrated in FIG. 3B. In the example illustrated in FIG. 3B, the circuit board 13 is formed including three layers of the circuit boards 13-1 to 13-3, the coil 32 in a loop shape is formed on each circuit board 13, and the coils 32 of respective layers form one connected coil.

Furthermore, in a case where the circuit board 13 is formed including three layers as illustrated in FIG. 3B, for example, the coils 32 may be respectively formed in the circuit board 13-1 in the first layer and the circuit board 13-3 in the third layer, the coil 32 does not have to be formed on the circuit board 13-2 in the second layer, and the circuit board 13-2 may be used exclusively for a circuit for externally outputting the electric signal from the imaging element 11.

In the case of being formed in this way, a wiring line for connecting the coil 32 formed on the circuit board 13-1 to the coil 32 formed on the circuit board 13-3 is formed on the circuit board 13-2.

As described above, the circuit board 13 can be formed including a plurality of layers, and the coil 32 can be formed across the plurality of layers. Furthermore, the number of layers and layer configuration of the circuit board 13 can be the number of layers and layer configuration described here, or can be other number of layers and layer configuration.

The circuit board 13 is, for example, a board including a plurality of layers in which copper wires are wired such as FPC, and has a role of externally outputting the electric signal of the imaging element 11 (FIG. 1). On such a circuit board 13, a copper wire is further wired in a coil shape for detecting a magnetic field.

A magnetic field generated when a current flows through the coil 24 (FIG. 2) in the actuator 18 flows into such a coil 32. As a result, induced electromotive force is generated in the coil 32. The induced electromotive force to be generated can be obtained by Federer's law.

When magnetic flux passing through an N-turn coil changes by $\Delta\Phi$ [Wb] during $\Delta t$ [s], induced electromotive force V [V] generated in the coil is expressed by the following equation (1).

$$V = -N \cdot \Delta\Phi / \Delta t \qquad (1)$$

From the equation (1), it can be seen that the induced electromotive force increases as the number of turns N increases, and by forming the coil 32 across the plurality of layers of the circuit board 13 as described above, the number of turns can be increased, and the induced electromotive force can be increased. Thus, a configuration can be made in which the induced electromotive force to be generated is easily detected.

A configuration will be described of the detection circuit 31 connected to such a coil 32. Note that, in the following description, the circuit board 13 is illustrated as being formed including one layer, and the description will be continued, but as described above, the circuit board 13 is formed including the plurality of layers.

Next, an example will be described in which the induced electromotive force for the position detection in the X-axis direction and the Y-axis direction of the lens 16 is detected, by mounting the coils 33 constituting a part of the detection circuit 31.

Figure 4:
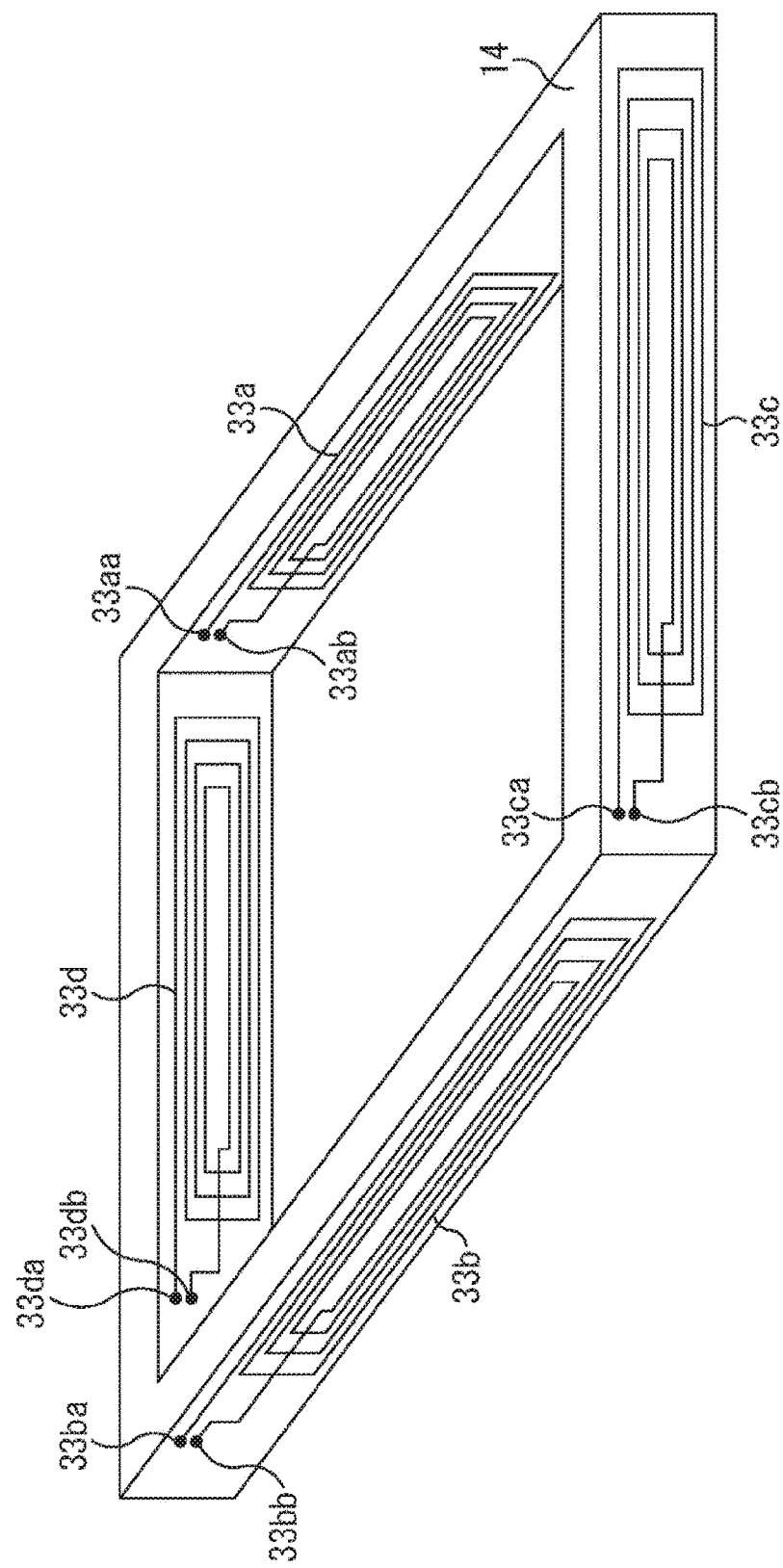
FIG. 4 is a diagram for explaining a case where coils are formed on a spacer.
Figure 5:
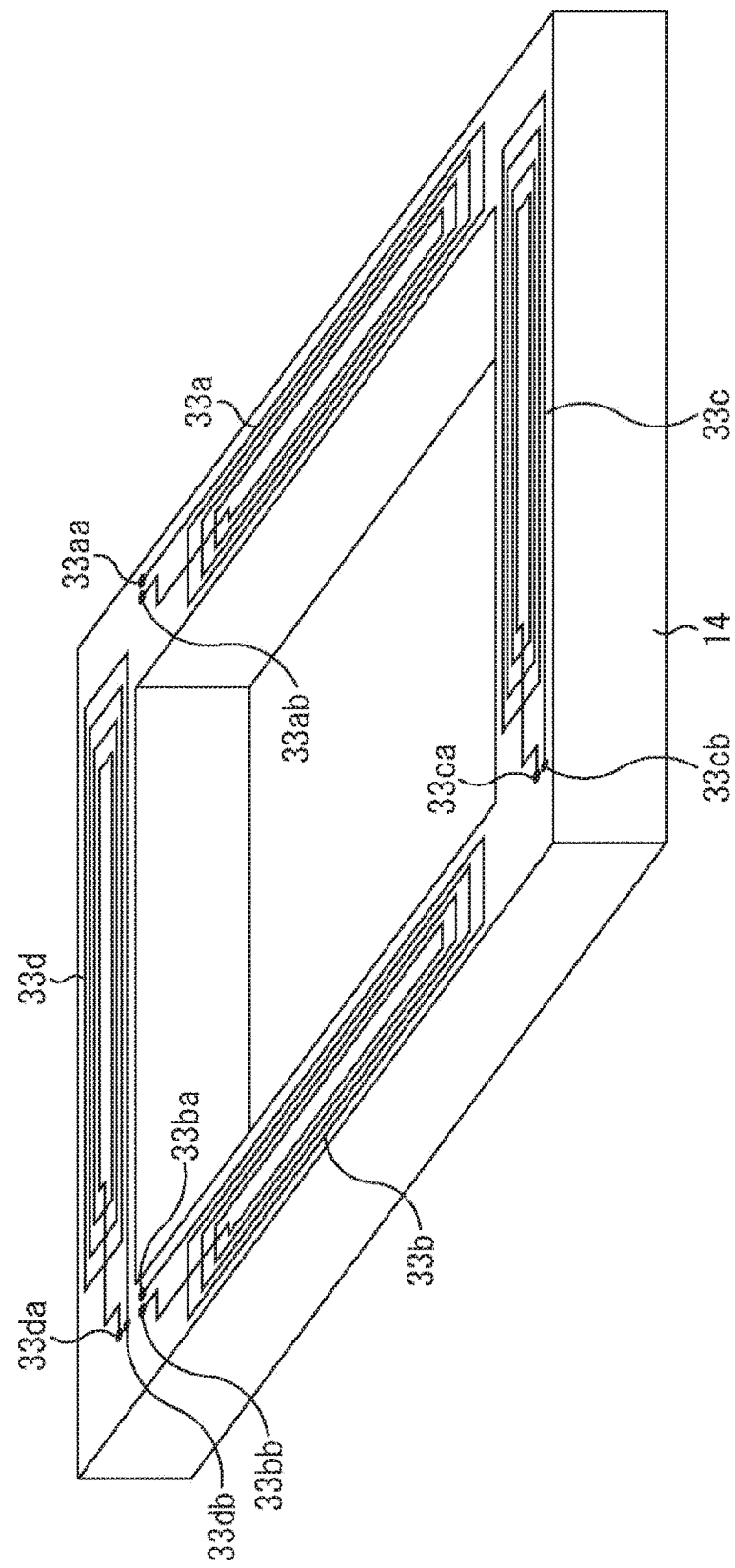
FIG. 5 is a diagram for explaining a case where the coils are formed on the spacer.

FIGS. 4 and 5 are diagrams each illustrating a mounting example of the coils 33 mainly constituting the part of the detection circuit 31 in the X-axis and Y-axis of the actuator onto the spacer 14. In FIGS. 4 and 5, a case is illustrated where the spacer 14 is provided with the coils 33a to 33d, but a configuration may be adopted in which surfaces are formed on the circuit board 13 in a direction perpendicular or horizontal to the circuit board 13, and the coils 33a to 33d are respectively provided on the surfaces.

As illustrated in FIG. 4, by arranging the coils 33a to 33d inside or outside the spacer 14 for connecting the actuator 18 to the circuit board 13 provided with the imaging element 11, the imaging device 1a can be downsized.

Furthermore, as illustrated in FIG. 5, by arranging the coils 33a to 33d on the upper surface or the lower surface of the spacer 14 for connecting the actuator 18 to the circuit board 13 provided with the imaging element 11, the imaging device 1a can be downsized.

The coils 33a to 33d each have the start point and the end point, like the coil 32 illustrated in FIGS. 3A and 3B. The coil 33a has a start point 33aa and an end point 33ab, the coil 33b has a start point 33ba and an end point 33bb, the coil 33c has a start point 33ca and an end point 33cb, and the coil 33d has a start point 33da and an end point 33db.

These start points and end points are connected to the detection circuit 31 not illustrated in FIGS. 4 and 5. In each of the coils 33, for a loop shape, and to make that the line does not have overlap, one of the start point or the end point is positioned inside the loop, and the other is positioned outside the loop.

That is, each of the coils 33 can have a configuration similar to that of the coil 32 described with reference to FIGS. 3A and 3B, and can have, for example, a two-layer or three-layer structure.

Note that, in FIGS. 4 and 5, a case where the four coils 33a to 33d are provided has been taken as an example, but the two coils 33 may be provided. A case where the two coils 33 are provided will be described later with reference to FIG. 9, and here, first, the description will be continued for the case where the four coils 33a to 33d are provided.

Furthermore, the four coils 33a to 33d may be arranged on the same surface side, for example, on the upper surface of the spacer 14 as illustrated in FIG. 5, or may be arranged on different surfaces. The coils 33 may be respectively arranged on different surfaces, for example, the coil 33a and the coil 33b may be arranged on the upper surface of the spacer 14, the coil 33c and the coil 33d may be arranged on the side surface of the spacer 14, or the like.

Furthermore, the plurality of coils 33 may be arranged on one side of the spacer 14. For example, the coils 33 may be respectively arranged on the upper surface and the side surface of one side of the spacer 14, and induced electromotive forces generated in the coils 33 arranged on the two surfaces may be respectively detected and individually used, or integrated and used, in the subsequent processing.

The present technology can be applied regardless of whether the material of the spacer 14 is inorganic or organic. By forming the spacer 14 using an organic material, the number of turns of each of the coils 33 formed on the spacer 14 can be increased, and improvement in characteristics can be expected.

<Configuration of Detection Circuit>

Figure 6:
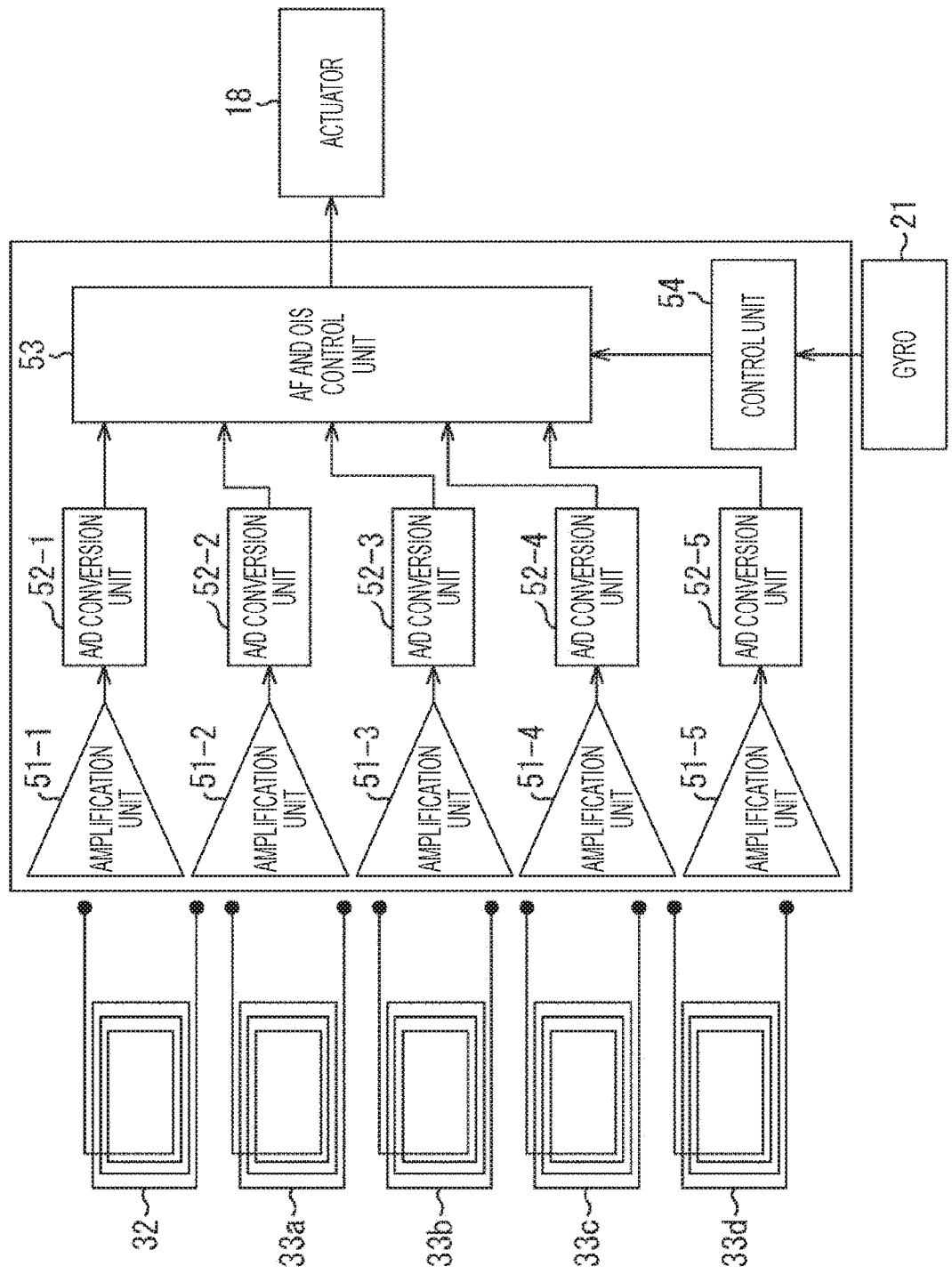
FIG. 6 is a diagram illustrating a configuration example of a detection circuit.

FIG. 6 is a diagram illustrating a configuration example of the detection circuit 31. The induced electromotive forces respectively generated in the coil 32 and the coils 33a to 33d are input to the respective amplification units 51-1 to 51-5 of the detection circuit 31 and amplified. The amplified induced electromotive forces are respectively input to Analog/Digital (A/D) conversion units 52-1 to 52-5, and converted from analog data to digital data. Hereinafter, the amplification units 51-1 to 51-5 will be simply described as the amplification units 51 in a case where it is not necessary to individually distinguish the amplification units. Other portions are also described in the similar manner.

An AF and OIS control unit 53 is a portion that controls the actuator 18, and recognizes a focal length of the lens 16 (FIG. 1) with the digital data from the A/D conversion unit 52-1, and in a case where correction is necessary, in other words, in a case where it is determined that the focus is not adjusted, a PWM control signal depending on a moving distance required for the correction is generated and supplied to the actuator 18.

Moreover, the AF and OIS control unit 53 recognizes an XY distance of the lens 16 (FIG. 1) with the digital data from the A/D conversion units 52-2 to 52-5, and senses the camera shake from the gyro sensor 21, and in a case where it is determined that correction is necessary in the XY direction, in other words, in a case where it is determined that the movement in the XY direction is necessary for camera shake correction, a PWM control signal depending on a XY movement distance necessary for the correction is generated and supplied to the actuator 18.

Note that, the AF and OIS control unit 53 also performs processing of generating a PWM control signal with a signal from a control unit 54 that controls autofocus (AF) and camera shake correction (OIS) and supplying the PWM control signal to the actuator 18.

The detection circuit 31 may be mounted as one integrated circuit inside the imaging device 1a, or may be mounted outside the imaging device 1a. Furthermore, the detection circuit 31 may be implemented as software instead of the integrated circuit, or as software of an integrated CPU of a camera.

The present technology has a function of detecting the induced electromotive force and a function of adjusting the focus of the lens and the XY position of the lens with high accuracy by the induced electromotive force, and not only a case where those functions are implemented by the integrated circuit or the software as described above, but also cases where the functions are implemented by other methods are within the scope of the present invention, of course.

Figure 7:
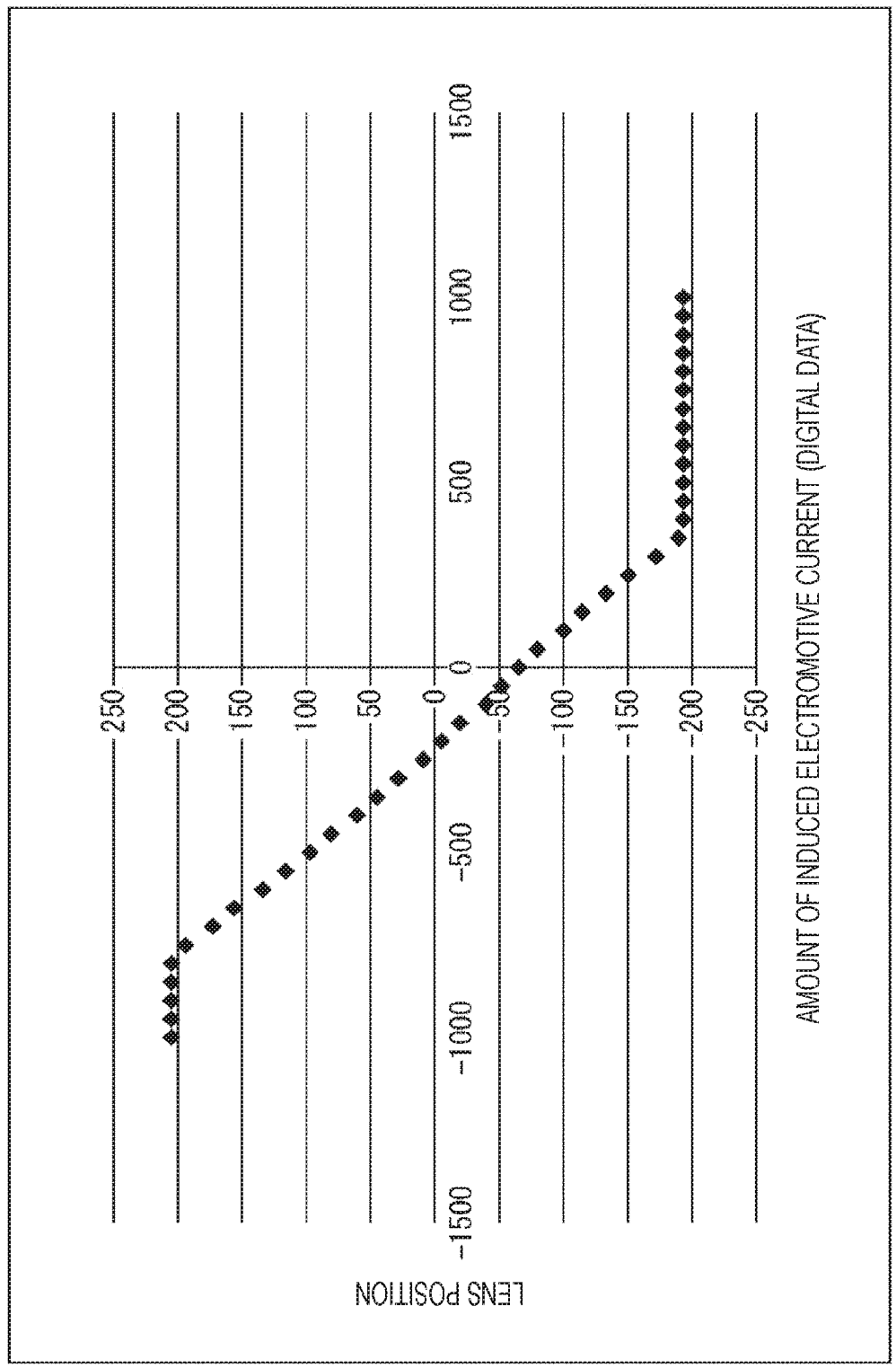
FIG. 7 is a diagram for explaining a position of a lens and an amount of induced electromotive force.

It has been described that the positions in the X-axis direction, the Y-axis direction, and the Z-axis direction of the lens 16 can be detected by detecting the induced electromotive forces flowing in the coil 32 and the coils 33, and this is because a relationship indicated in FIG. 7 is established. FIG. 7 is a graph illustrating a relationship between the position of the lens 16 and the detected induced electromotive force. In FIG. 7, the vertical axis represents the position of the lens, and the horizontal axis represents the amount of current of the induced electromotive force (digital data).

As described above, the autofocus is implemented by adjusting the distance between the imaging element 11 and the lens 16. Thus, a distance between the lens 16 and the coil 32 also changes due to the autofocus. Moreover, in other words, as the lens 16 moves, the coil 24 (FIG. 2) in the actuator 18 also moves.

Furthermore, the camera shake correction is implemented by moving the lens 16 in the direction (XY plane) horizontal to the imaging element 11 surface, and a distance between the lens 16 and the each of the coils 33 changes, in other words, as the lens 16 moves due to the camera shake correction, the coil 24 (FIG. 2) in the actuator 18 also moves in the XY direction.

An influence of the magnetic field generated by the current flowing through the coil 24 on the coil 32 (coils 33, hereinafter, the description will be continued taking the coil 32 as an example) is large when the lens 16 (coil 24) is in a position close to the coil 32, and is small when the lens 16 (coil 24) is in a position away from the coil 32. Thus, when the lens 16 (coil 24) is in the position close to the coil 32, the induced electromotive force is large, and when the lens 16 (coil 24) is in the position away from the coil 32, the induced electromotive force is small.

When this fact is expressed in a graph, a graph is obtained as illustrated in FIG. 7. FIG. 7 is a graph illustrating a case where the lens 16 approaches the coil 32 as it goes from the upper side to the lower side in the figure. Furthermore, it is a graph in which a current value increases as it goes from the left side to the right side in FIG. 7. Furthermore, in FIG. 7, the center position of the movable range of the lens is 0, and the current value is a plus value in a case where the current flows in a predetermined direction and is a minus value in a case where the current flows in an opposite direction from the predetermined direction.

From the graph illustrated in FIG. 7, it can be seen that the induced electromotive force changes in a linear function. From these facts, it can be seen that the induced electromotive force and the position of the lens 16 have a one-to-one relationship. Thus, by detecting the induced electromotive force flowing in the coil 32, the position of the lens 16 at that time can be detected.

By using such a relationship, it is possible to detect, by the detection circuit 31, a position B that is a position of the lens 16 after the control is performed for moving the lens 16 to a desired position A by the AF and OIS control unit 53, for example.

Furthermore, in a case where there is a deviation between the desired position A and the detected position B, the deviation can be corrected and the position can be moved to the desired position A. Thus, high-performance lens movement can be implemented.

Moreover, a description will be added for the position detection of the lens 16 (coil 24) on the XY plane. FIGS. 8A, 8B, 8C, 8D, and 8E are diagrams illustrating transition of the induced electromotive force when the lens 16 moves in the XY direction due to the camera shake correction, for each of the coils 33a to 33d.

Figure 8:
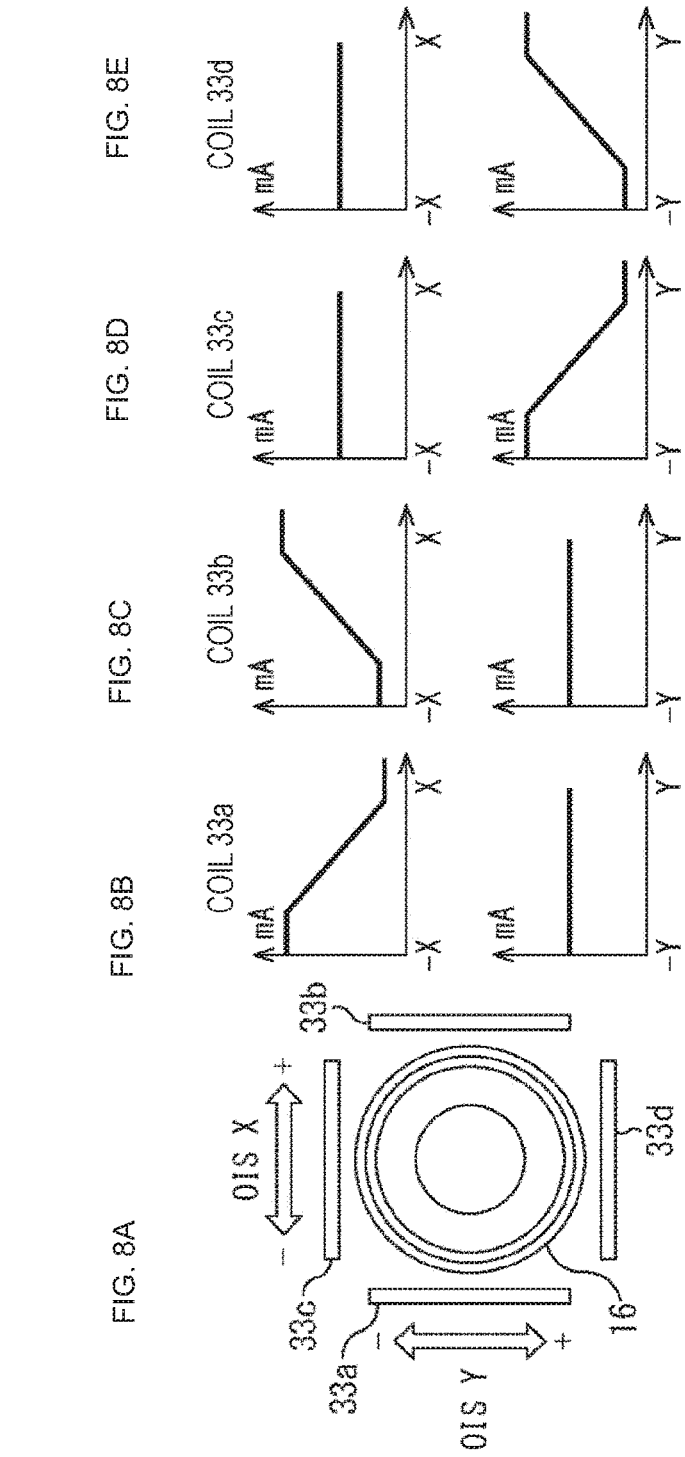
FIGS. 8A, 8B, 8C, 8D, and 8E are diagrams for explaining induced electromotive force generated in each coil.

FIG. 8A is a diagram of the lens 16 as viewed from above. In FIG. 8A, when the horizontal direction is the X-axis direction and the center of the lens 16 is 0, the left side is the minus direction (−X direction) and the right side is the plus direction (+X direction). Furthermore, in FIG. 8A, when the vertical direction is the Y-axis direction and the center of the lens 16 is 0, the upper side is the minus direction (−Y direction) and the lower side is the plus direction (+Y direction).

The coil 33a is provided on the left side (−X side) of the lens 16 in the figure, and the coil 33b is provided on the right side (+X side) of the figure. The lens 16 (coil 24) moves in the XY plane parallel to the imaging element 11 due to the camera shake correction, whereby a magnetic field is generated, and an influence of the magnetic field on each of the coils 33 is large when the lens 16 (coil 24) is in a position close to each of the coils 33, and is small when the lens 16 (coil 24) is in a position away from each of the coils 33.

When this fact is expressed in graphs, they are illustrated as FIGS. 8B, 8C, 8D, and 8E. In the graphs illustrated in FIGS. 8B, 8C, 8D, and 8E, the horizontal axis represents the position of the lens 16, and the vertical axis represents the induced electromotive force generated in each of the coils 33. Furthermore, in FIGS. 8B, 8C, 8D, and 8E, the graph illustrated in the upper part is a graph of the induced electromotive force when the lens 16 moves from the −X side to the +X side, and the graph illustrated in the lower part is a graph of the induced electromotive force when the lens 16 moves from the −Y side to the +Y side.

Referring to FIG. 8B, in a case where the lens 16 moves from the −X side to the +X side, the lens 16 changes from a state of being close to the coil 33a to a state of being away from the coil 33a. In a case where such a change occurs, the induced electromotive force generated in the coil 33a gradually decreases as the lens 16 moves from the −X side to the +X side, as illustrated in the upper graph of FIG. 8B.

On the other hand, in a case where the lens 16 moves in the Y-axis direction, a positional relationship between the lens 16 and the coil 33a is constant, and a distance between the lens 16 and the coil 33a does not change, so that the induced electromotive force generated in the coil 33a does not change and has a constant value.

Referring to FIG. 8C, in the case where the lens 16 moves from the −X side to the +X side, the lens 16 changes from a state of being away from the coil 33b to a state of being close to the coil 33b. In a case where such a change occurs, the induced electromotive force generated in the coil 33b gradually increases as the lens 16 moves from the −X side to the +X side, as illustrated in the upper graph of FIG. 8C.

On the other hand, in the case where the lens 16 moves in the Y-axis direction, a positional relationship between the lens 16 and the coil 33b is constant, and a distance between the lens 16 and the coil 33b does not change, so that the induced electromotive force generated in the coil 33b does not change and has a constant value.

As described above, when the lens 16 moves in the X-axis direction, the induced electromotive force generated in each of the coils 33a and 33b changes, so that the position in the X-axis direction of the lens 16 can be detected by measuring the induced electromotive force generated in the coil 33a or the coil 33b.

Referring to FIG. 8D, in a case where the lens 16 moves in the X-axis direction, a positional relationship between the lens 16 and the coil 33c is constant, and a distance between the lens 16 and the coil 33c does not change, so that the induced electromotive force generated in the coil 33c does not change and has a constant value.

On the other hand, in a case where the lens 16 moves from the −Y side to the +Y side, the lens 16 changes from a state of being close to the coil 33c to a state of being away from the coil 33c. In a case where such a change occurs, the induced electromotive force generated in the coil 33a gradually decreases as the lens 16 moves from the −Y side to the +Y side, as illustrated in the lower graph of FIG. 8D.

Referring to FIG. 8E, in the case where the lens 16 moves in the X-axis direction, a positional relationship between the lens 16 and the coil 33d is constant, and a distance between the lens 16 and the coil 33d does not change, so that the induced electromotive force generated in the coil 33d does not change and has a constant value.

On the other hand, in the case where the lens 16 moves from the −Y side to the +Y side, the lens 16 changes from a state of being away from the coil 33d to a state of being close to the coil 33d. In a case where such a change occurs, the induced electromotive force generated in the coil 33d gradually increases as the lens 16 moves from the −Y side to the +Y side, as illustrated in the lower graph of FIG. 8E.

As described above, when the lens 16 moves in the Y-axis direction, the induced electromotive force generated in each of the coil 33c and the coil 33d changes, so that the position in the Y-axis direction of the lens 16 can be detected by measuring the induced electromotive force generated in the coil 33c or the coil 33d.

By using such a relationship, it is possible to detect, by the detection circuit 31, a position B that is a position of the lens 16 after the control is performed for moving the lens 16 to a desired position A by the AF and OIS control unit 53, for example.

Furthermore, in a case where there is a deviation between the desired position A and the detected position B, the deviation can be corrected and the position can be moved to the desired position A. Thus, high-performance lens movement can be implemented.

Second Embodiment

As described with reference to FIGS. 8A, 8B, 8C, 8D, and 8E, since the position in the X-axis direction of the lens 16 can be detected by measuring the induced electromotive force generated in the coil 33a or the coil 33b, it is also possible to adopt a configuration including one of the coil 33a or the coil 33b. Furthermore, since the position in the Y-axis direction of the lens 16 can be detected by measuring the induced electromotive force generated in the coil 33c or the coil 33d, it is also possible to adopt a configuration including one of the coil 33c or the coil 33d.

Figure 9:
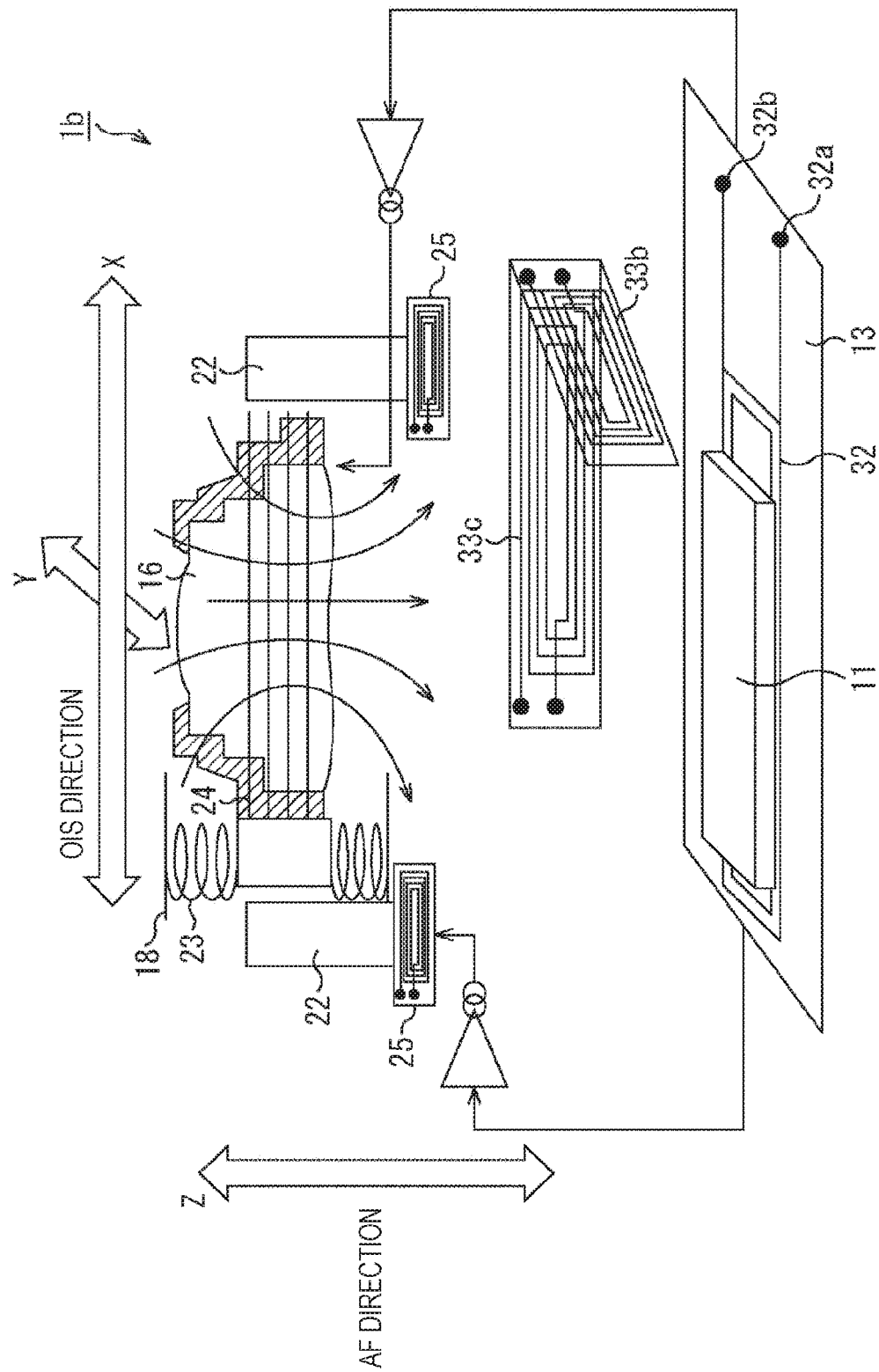
FIG. 9 is a diagram illustrating another configuration example of the imaging device.

FIG. 9 illustrates a configuration of the imaging device 1 including the coil 33 that detects the position in the X-axis direction of the lens 16 and the coil 33 that detects the position in the Y-axis direction of the lens 16 as described above. The imaging device 1b illustrated in FIG. 9 includes the coil 33b for detecting the position in the X-axis direction of the lens 16 and the coil 33c for detecting the position in the Y-axis direction of the lens 16.

Figure 10:
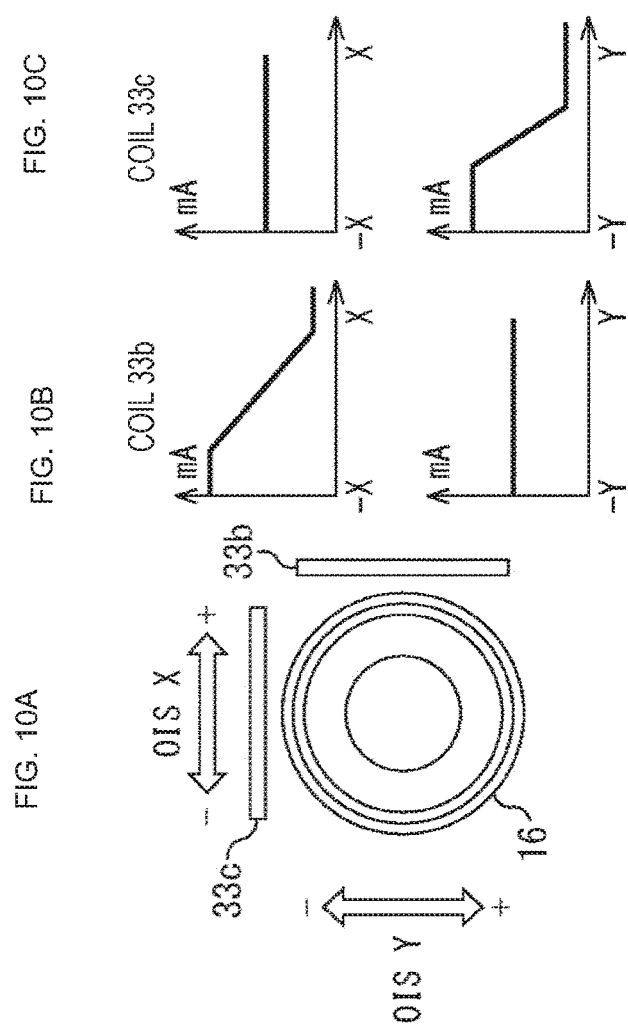
FIGS. 10A, 10B, and 10C are diagrams for explaining induced electromotive force generated in each coil.

In the case of the imaging device 1 illustrated in FIG. 9, as illustrated in FIGS. 10A, 10B, and 10C, the position in the X-axis direction of the lens 16 can be detected by measuring the induced electromotive force generated in the coil 33b. That is, as illustrated in FIG. 10B, in the case where the lens 16 moves from the −X side to the +X side, the induced electromotive force generated in the coil 33b gradually decreases as the lens 16 moves from the −X side to the +X side, so that the position in the X-axis direction of the lens 16 can be detected by using this fact.

Similarly, the position in the Y-axis direction of the lens 16 can be detected by measuring the induced electromotive force generated in the coil 33c. That is, as illustrated in FIG. 10C, in the case where the lens 16 moves from the −Y side to the +Y side, the induced electromotive force generated in the coil 33c gradually decreases as the lens 16 moves from the −Y side to the +Y side, so that the position in the Y-axis direction of the lens 16 can be detected by using this fact.

Note that, here, the description has been made taking the case where the coil 33b and the coil 33c are included as an example, but a configuration may be adopted where the coil 33a and the coil 33c, the coil 33a and the coil 33d, or the coil 33b and the coil 33d are included.

As a configuration of an imaging device 1 that detects the position of the XY plane of the lens 16, a configuration including the coils 33 on four sides may be adopted as illustrated in FIG. 2, or a configuration including the coils 33 on two sides may be adopted as illustrated in FIG. 9.

In a case where the configuration including the coils 33 on the four sides is adopted as illustrated in FIG. 2, a graph of the induced electromotive force as illustrated in FIG. 8B can be obtained from the coil 33a, and a graph of the induced electromotive force as illustrated in FIG. 8C can be obtained from the coil 33b. That is, two pieces of position information can be obtained for detecting the position in the X-axis direction of the lens 16.

Using the two pieces of position information, for example, predetermined calculation is performed such as multiplying the two pieces of position information (values of the induced electromotive force), adding, or taking an absolute value of a subtracted value, and from the calculation result, it is possible to detect the position in the X-axis direction of the lens 16.

Similarly, in the case where the configuration including the coils 33 on the four sides is adopted, a graph of the induced electromotive force as illustrated in FIG. 8D can be obtained from the coil 33c, and a graph of the induced electromotive force as illustrated in FIG. 8E can be obtained from the coil 33d. That is, two pieces of position information can be obtained for detecting the position in the Y-axis direction of the lens 16.

Using the two pieces of position information, for example, predetermined calculation is performed such as multiplying the two pieces of position information (values of the induced electromotive force), adding, or taking an absolute value of a subtracted value, and from the calculation result, it is possible to detect the position in the Y-axis direction of the lens 16.

Since an amount of movement in the XY plane for the camera shake correction is smaller than an amount of movement in the Z-axis direction for the autofocus, the induced electromotive force generated in each of the coils 33 due to the movement of the lens 16 (coil 24) in the XY plane for the camera correction is smaller than the induced electromotive force generated in the coil 32 due to the movement of the lens 16 (coil 24) in the Z-axis direction for the autofocus.

Even in a case where the induced electromotive force generated in one of the coils 33 is small, the configuration including the coils 33 on the four sides is adopted, and detection results of the induced electromotive force from the coils 33 provided on two different sides are used, whereby position detection accuracy can be improved.

In the case where the configuration including the coils 33 on the two sides is adopted as illustrated in FIG. 9, there is a possibility that the position detection accuracy is lower than that in the case where the configuration including the coils 33 on the four sides is adopted. However, in the case where the configuration including the coils 33 on the two sides is adopted, as compared with the case where the configuration including the coils 33 on the four sides is adopted, effects can be obtained such as that the cost can be reduced, and that the other members can be arranged on the sides where the coils 33 are not arranged and the device can be downsized.

Furthermore, by adopting a configuration in which the number of turns of each of the coils 33 is increased or an arrangement positions of the coils 33 are brought close to the coil 24 as much as possible, it is also possible to prevent the position detection accuracy from being degraded. Furthermore, proper use is of course possible, for example, by adopting the configuration including the coils 33 on the two sides for the imaging device 1 that does not require highly accurate position detection, and adopting the configuration including the coils 33 on the four sides for the imaging device 1 that requires highly accurate position detection.

Third Embodiment

As still another configuration of the imaging device 1, a description will be added for an imaging device 1c further including a configuration for effectively inputting an electromagnetic field to the coils 33 for lens position detection in the XY direction.

Figure 11:
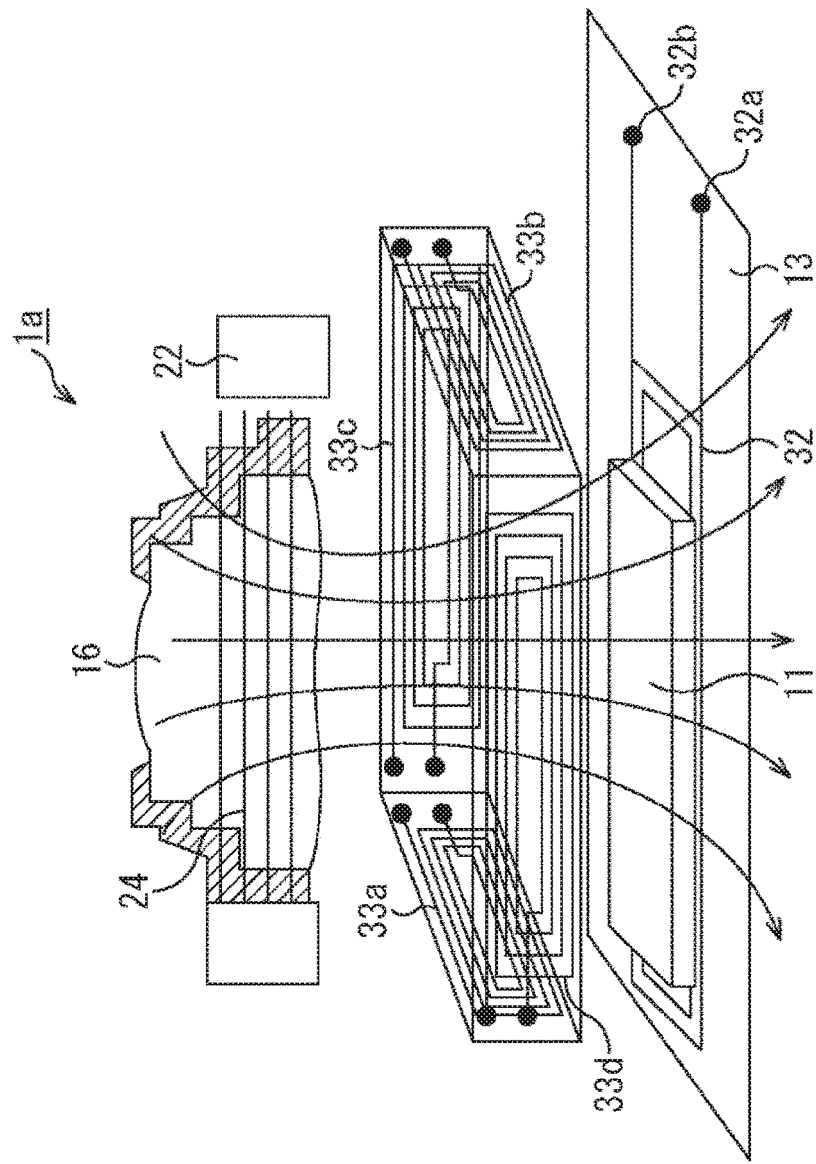
FIG. 11 is a diagram for explaining a magnetic field generated in the imaging device.

In FIG. 11, the imaging device 1*a* described above is illustrated again, and a description will be added for the magnetic field. The electromagnetic field generated by the coil 24 included in the actuator 18 for driving the lens 16 is generated in a circular or elliptical shape, at the center of the coil 24.

In FIG. 11, an elliptical magnetic field is illustrated. To efficiently generate the induced electromotive force in the coils 33 due to an influence of such a magnetic field, it is preferable that the magnetic field is perpendicularly incident on the coils 33.

Figure 12:
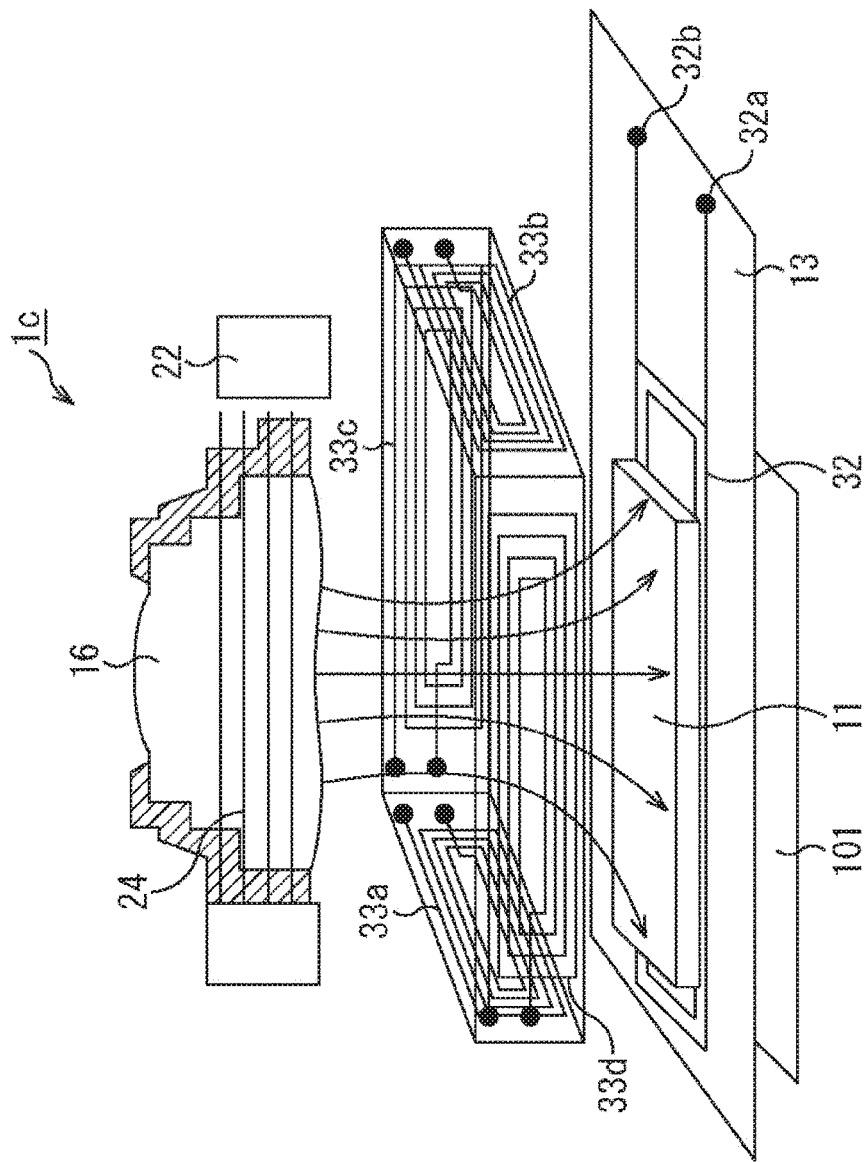
FIG. 12 is a diagram illustrating another configuration example of the imaging device.

Thus, to allow the magnetic field to be perpendicularly incident on the coils 33, a shield layer 101 is provided in a lower layer than the circuit board 13 as illustrated in FIG. 12. By providing the shield layer 101, the magnetic field is bent by the shield layer 101, the magnetic field can be effectively incident on the coils 33, and the induced electromotive force can be efficiently generated in the coils 33.

The induced electromotive force can be efficiently generated by the coils 33, whereby accuracy can be improved when the position of the lens 16 is detected from a measured value of the induced electromotive force.

Furthermore, in a mobile terminal or the like, the imaging device 1 itself may be configured to be shielded as a measure against Electro-Magnetic Interference (EMI), and this shield can be used as the shield layer 101. Thus, it is possible to prevent that the cost is increased and the size of the imaging device 1 is increased due to the additional provision of the shield layer 101.

<Detection of Lens Tilt>

In the embodiments described above, the description has been made taking the case where the positions of the lens 16 in the X-axis direction, the Y-axis direction, and the Z-axis direction are detected as an example. By using this fact, a tilt of the lens 16 can also be detected.

In the above description, the description has been made taking a case where, as a premise, the lens 16 has no tilt, in other words, the lens 16 and the imaging element 11 are kept parallel to each other as an example. However, there is a possibility that a tilt occurs in the lens 16, and it is also possible to provide a function of detecting such a tilt when the tilt occurs and correcting the tilt.

Ideally, the lens 16 (coil 24) and the imaging element 11 are in a state in which an optical axis passing through the lens 16 is perpendicular to the imaging element 1. However, if at least one of the lens 16, the actuator 18, or the imaging element 1 is mounted in a tilted state, or if a tilt occurs during use, there is a possibility that the optical axis passing through the lens 16 and the imaging element 1 are brought into a state in which they are not perpendicular to each other.

Thus, in the following, a description will be added for a configuration in which the tilt of the lens 16 or the imaging element 11 can also be detected by using the induced electromotive force generated in the coils 33 as described above.

Figure 13:
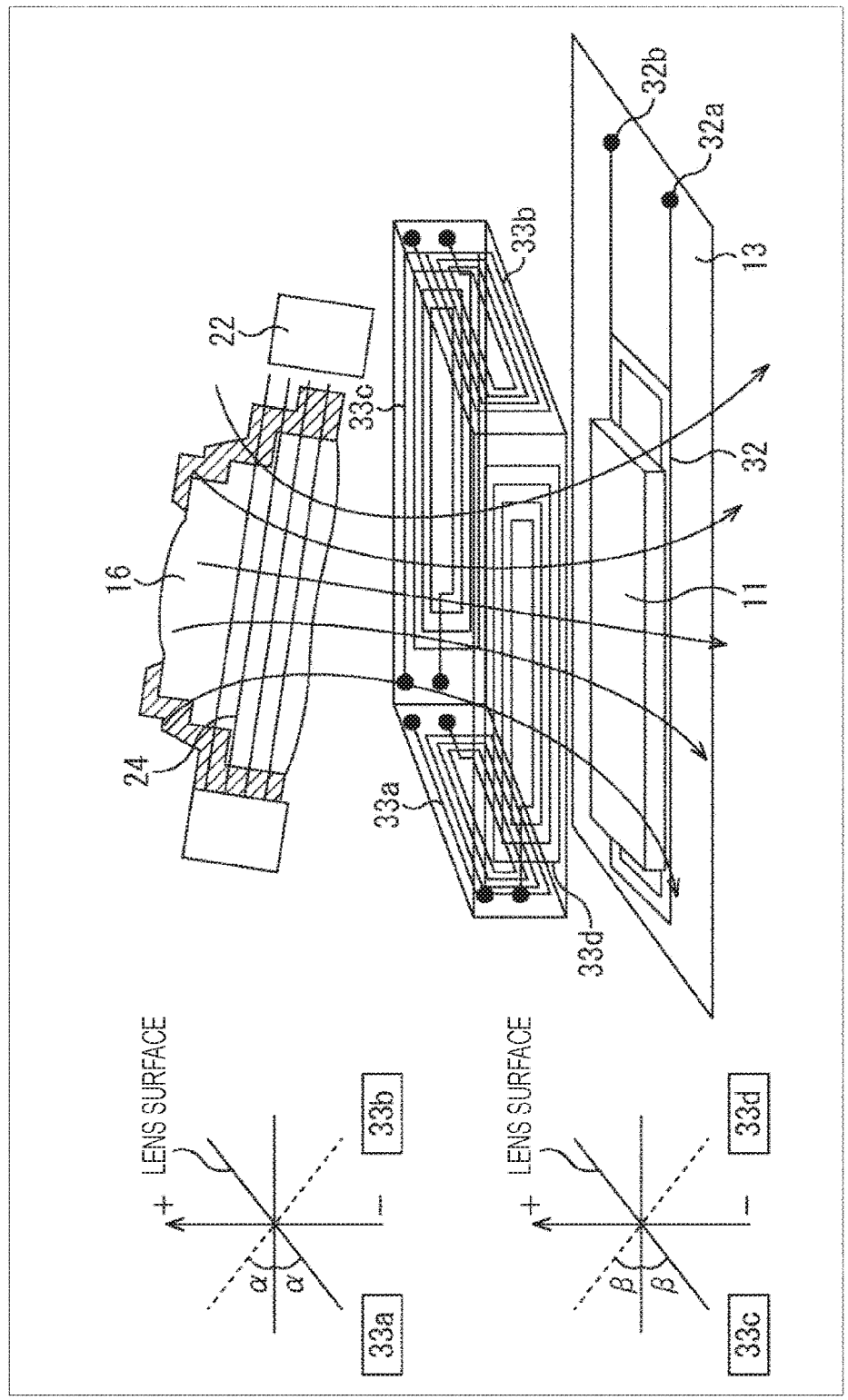
FIG. 13 is a diagram for explaining detection of tilt.

FIG. 13 is a diagram schematically illustrating a state in which the lens 16 is tilted, although the configuration is similar to that of the imaging device 1*a* illustrated in FIG. 2. The state illustrated in FIG. 13 illustrates a case where the lens 16 is tilted so that its left side is the upper side and its right side is the lower side in the figure.

The situation as illustrated in FIG. 13 is a situation in which the coil 24 is positioned far from the coil 33*a* and close to the coil 33*b*. Thus, in such a situation, the induced electromotive force generated in the coil 33*a* is smaller than the induced electromotive force generated in the coil 33*b*. The fact that the induced electromotive forces generated in the coils 33 differ depending on such relative positions of the coil 24 and the coils 33 is the same as the case described above, for example, the case described with reference to FIGS. 8A, 8B, 8C, 8D, and 8E.

Here, as illustrated in the left diagram of FIG. 13, a tilt α and a tilt β of the lens 16 are set. The tilt α is a minus tilt in a state in which the lens 16 is tilted toward a side close to the coil 33*a* in the coils 33*a* and 33*b* (X-axis direction), and is a plus tilt in a state in which the lens 16 is tilted toward a side close to the coil 33*b*. Furthermore, the tilt β is a minus tilt in a state in which the lens 16 is tilted toward a side close to the coil 33*c* in the coils 33*c* and 33*d* (Y-axis direction), and is a plus tilt in a state in which the lens 16 is tilted toward a side close to the coil 33*d*.

FIGS. 14A, 14B, 14C, and 14D illustrate a distribution of the induced electromotive force when the tilt occurs. Referring to the graph of the induced electromotive force of the coil 33*a* illustrated in FIG. 14A, in a case where the tilt α changes from minus θ to plus θ, in other words, the coil 24 is tilted in a direction in which the coil 24 is away from the coil 33*a*, the induced electromotive force is reduced. In the coil 33*a*, as in the case described with reference to FIGS. 8A, 8B, 8C, 8D, and 8E, there is no change in the induced electromotive force due to the change in the tilt in the Y-axis direction.

Referring to the graph of the induced electromotive force of the coil 33*b* illustrated in FIG. 14B, in the case where the tilt α changes from minus θ to plus θ, in other words, the coil 24 is tilted in a direction in which the coil 24 is close to the coil 33*b*, the induced electromotive force is increased. In the coil 33*b*, as in the case described with reference to FIGS. 8A, 8B, 8C, 8D, and 8E, there is no change in the induced electromotive force due to the change in the tilt in the Y-axis direction.

Referring to the graph of the induced electromotive force of the coil 33*c* illustrated in FIG. 14C, in a case where the tilt β changes from minus θ to plus θ, in other words, the coil 24 is tilted in a direction in which the coil 24 is away from the coil 33*c*, the induced electromotive force is reduced. In the coil 33*c*, as in the case described with reference to FIGS. 8A, 8B, 8C, 8D, and 8E, there is no change in the induced electromotive force due to the change in the tilt in the X-axis direction.

Referring to the graph of the induced electromotive force of the coil 33*d* illustrated in FIG. 14D, in the case where the tilt β changes from minus θ to plus θ, in other words, the coil 24 is tilted in a direction in which the coil 24 is close to the coil 33*d*, the induced electromotive force is increased. In the coil 33*d*, as in the case described with reference to FIGS. 8A, 8B, 8C, 8D, and 8E, there is no change in the induced electromotive force due to the change in the tilt in the X-axis direction.

As described above, the induced electromotive forces generated in the coils 33 differ depending on the tilt of the lens 16 (difference in the positional relationship with the coil 24). This is the same as the case described with reference to FIGS. 8A, 8B, 8C, 8D, and 8E.

For example, with the induced electromotive force when the lens 16 has no tilt in the X-axis direction (when tilt α=0) as a reference (set as a reference value), if an absolute value of a difference between the induced electromotive force of the coil 33*a* and the reference value is equal to an absolute value of a difference between the induced electromotive force of the coil 33*b* and the reference value, it can be determined that there is no tilt in the X-axis direction, and if they are not equal to each other, it can be determined that there is a tilt in the X-axis direction.

Furthermore, as a result of the determination, in a case where it is determined that there is a tilt, a position of the coil 24 with respect to the coil 33a and a position of the coil 24 with respect to the coil 33b each are obtained from the magnitude of the induced electromotive force, and the tilt α can also be calculated from a positional relationship between the positions. Furthermore, when the tilt α is calculated, an amount of correction for eliminating the tilt α can be calculated, and correction of the tilt based on the amount of correction can also be performed.

Also for the tilt in the Y-axis direction, similarly, the tilt in the Y-axis direction can be detected from the induced electromotive forces of the coils 33c and 33d, and correction can be performed.

As described above, according to the present technology, the positions in the X-axis direction, the Y-axis direction, and the Z-axis direction of the lens 16, and the tilt of the lens 16 each can be detected. Thus, as the camera shake correction, not only the correction in the XY direction but also tilt correction can be performed, and it is possible to provide the imaging device 1 with higher functionality.

Moreover, by executing tilt detection to which the present technology is applied at the time of manufacturing the imaging device 1, it is possible to perform correction when there is a tilt or to remove the device from the manufacturing line in a case where the tilt is greater than or equal to a predetermined tilt. Thus, it is obvious that a defect of optical axis deviation is improved in a performance test after the manufacturing, and the manufacturing cost can be suppressed.

Fourth Embodiment

The application range of the present technology is a method for detecting the position of the lens 16 by detecting the induced electromotive force with respect to the movement in the XYZ direction of the lens 16 with the coil 32 and the coils 33, so that as long as the positions of the coil 32 and the coils 33 are in places where the induced electromotive force can be effectively detected, even if the installation position is any places, it is within the scope of the present invention.

Figure 15:
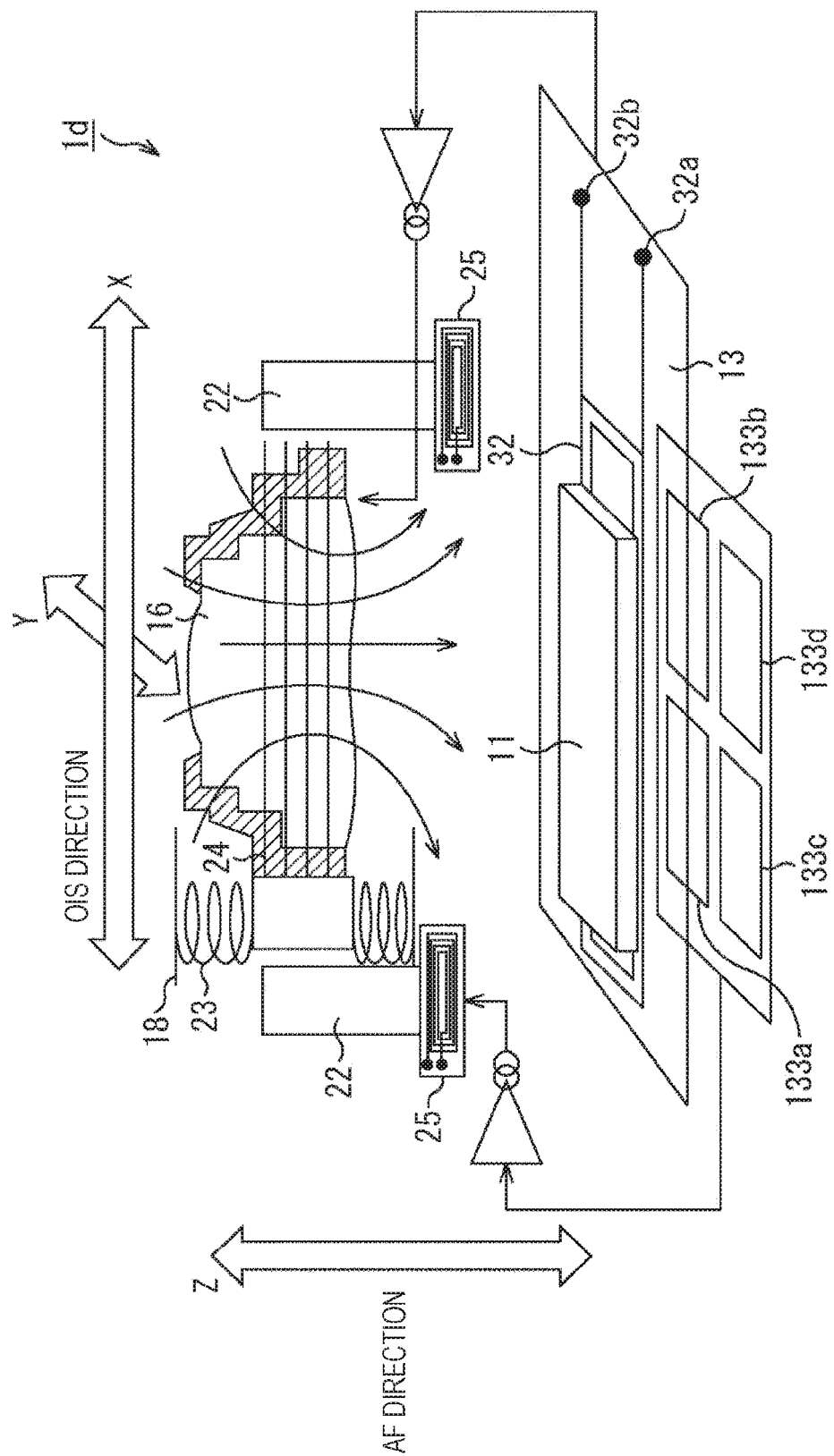
FIG. 15 is a diagram illustrating another configuration example of the imaging device.

In the imaging device 1 described above, the example has been described in which the coils 33a to 33d are respectively arranged on four surfaces provided in a direction perpendicularly intersecting the imaging surface of the imaging element 11 in the positional relationship with the imaging element 11 as illustrated in FIG. 2; however, as illustrated in FIG. 15, coils 133a to 133b corresponding to the coils 33a to 33d may be arranged on a surface provided in a direction horizontal to the imaging surface of the imaging element 11 in the positional relationship with the imaging element 11.

An imaging device 1d illustrated in FIGS. 16A, 16B, 16C, 16D, and 16E are embodiments of a two-layer configuration in which the coils 133a to 133d are provided in a lower layer than the coil 32 provided on the circuit board 13. The coil 32 provided on the circuit board 13 is a coil for Z position detection for the autofocus, as in the embodiment described above. The coils 133a to 133d provided in the lower layer than the circuit board 13 are coils for position detection in the XY direction for the camera shake correction.

Note that, in the case of the two-layer configuration, here, the description will be continued taking the case where the coils 133a to 133d are provided in the lower layer than the coil 32 as an example. 32; however, a configuration may be adopted in which the coils 133a to 133d are in the upper layer, the coil 32 is provided in the lower layer, and the coils 133a to 133d are formed on the circuit board 13.

As for the coils 133a to 133d, in the figure, the coil 133a is arranged on the upper left side, the coil 133b is arranged on the upper right side, the coil 133c is arranged on the lower left side, and the coil 133d is arranged on the lower right side.

Each of these coils 133a to 133d has a configuration similar to that of the coil 32, has a start point and an end point (not illustrated), and is connected to the detection circuit 31.

With reference to FIGS. 16A, 16B, 16C, 16D, and 16E, a description will be made for the induced electromotive force generated in each of the coils 133 in a case where the lens 16 (coil 24) moves in the XY plane in the coils 133a to 133d arranged on one plane as described above.

Figure 16:
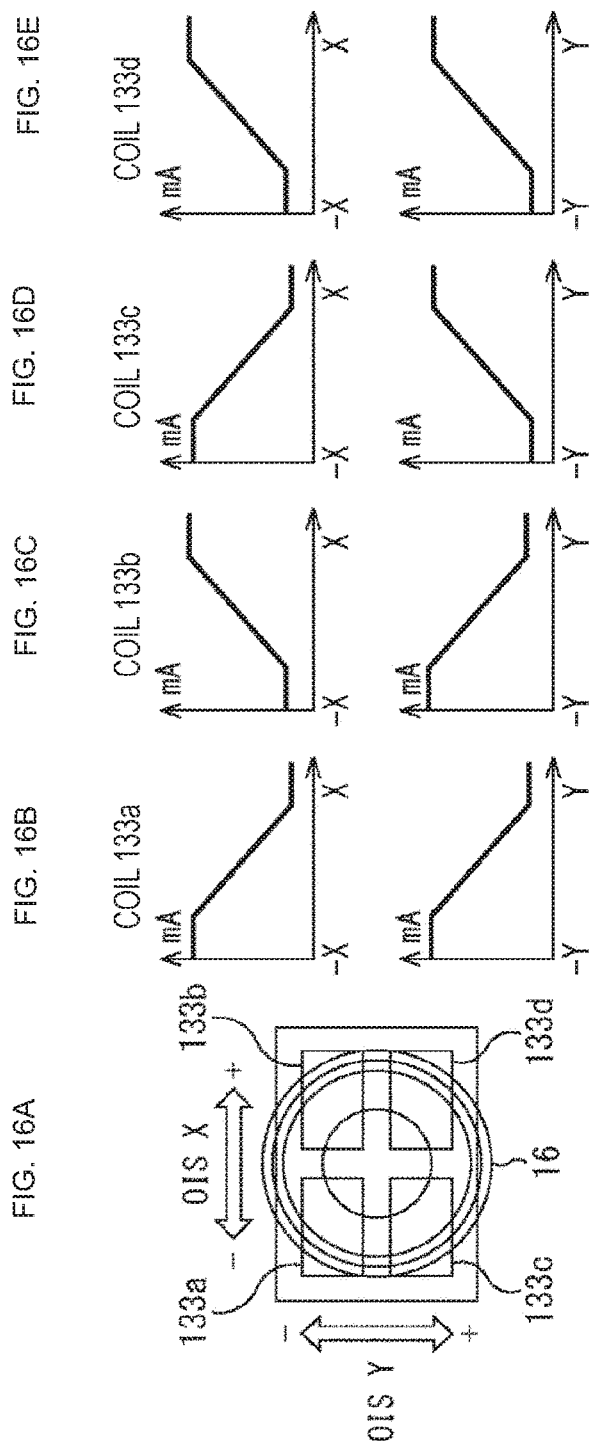
FIGS. 16A, 16B, 16C, 16D, and 16E are diagrams for explaining induced electromotive force generated in each coil.

FIG. 16A is a diagram of the lens 16 as viewed from above. In FIG. 16A, when the horizontal direction is the X-axis direction and the center of the lens 16 is 0, the left side is the minus direction (−X direction) and the right side is the plus direction (+X direction). Furthermore, in FIG. 16A, when the vertical direction is the Y-axis direction and the center of the lens 16 is 0, the upper side is the minus direction (−Y direction) and the lower side is the plus direction (+Y direction).

As illustrated in FIG. 16A, the coil 133a is provided on the upper left side (−X, −Y side) in the figure, and the coil 133b is provided on the upper right side (+X, −Y side) in the figure. Furthermore, the coil 133c is provided on the lower left side (−X, +Y side) in the figure, and the coil 133d is provided on the lower right side (+X, +Y side) in the figure.

The lens 16 (coil 24) moves in the XY plane parallel to the imaging element 11 due to the camera shake correction, whereby a magnetic field is generated, and an influence of the magnetic field on each of the coils 133 is large when the lens 16 (coil 24) is in a position close to each of the coils 133, and is small when the lens 16 (coil 24) is in a position away from each of the coils 133. This is the same as the imaging device 1a and the like in the embodiments described above.

When this fact is expressed in graphs, they are illustrated as FIGS. 16B, 16C, 16D, and 16E. In the graphs illustrated in FIGS. 16B, 16C, 16D, and 16E, the horizontal axis represents the position of the lens 16, and the vertical axis represents the induced electromotive force generated in each of the coils 133. Furthermore, in FIGS. 16B, 16C, 16D, and 16E, the graph illustrated in the upper part is a graph of the induced electromotive force when the lens 16 moves from the −X side to the +X side, and the graph illustrated in the lower part is a graph of the induced electromotive force when the lens 16 moves from the −Y side to the +Y side.

Referring to FIG. 16B, in the case where the lens 16 moves from the −X side to the +X side, the lens 16 changes from a state of being close to the coil 133a to a state of being away from the coil 133a. In a case where such a change occurs, the induced electromotive force generated in the coil 133a gradually decreases as the lens 16 moves from the −X side to the +X side, as illustrated in the upper graph of FIG. 16B.

Furthermore, referring to FIG. 16B, in the case where the lens 16 moves from the −Y side to the +Y side, the lens 16 changes from a state of being close to the coil 133a to a state of being away from the coil 133a. In a case where such a change occurs, the induced electromotive force generated in the coil 133a gradually decreases as the lens 16 moves from the −Y side to the +Y side, as illustrated in the lower graph of FIG. 16B.

Referring to FIG. 16C, in the case where the lens 16 moves from the −X side to the +X side, the lens 16 changes from a state of being away from the coil 133b to a state of being close to the coil 133b. In a case where such a change occurs, the induced electromotive force generated in the coil 133b gradually increases as the lens 16 moves from the −X side to the +X side, as illustrated in the upper graph of FIG. 16C.

Furthermore, referring to FIG. 16C, in the case where the lens 16 moves from the −Y side to the +Y side, the lens 16 changes from a state of being close to the coil 133b to a state of being away from the coil 133b. In a case where such a change occurs, the induced electromotive force generated in the coil 133b gradually decreases as the lens 16 moves from the −Y side to the +Y side, as illustrated in the lower graph of FIG. 16C.

Referring to FIG. 16D, in the case where the lens 16 moves from the −X side to the +X side, the lens 16 changes from a state of being close to the coil 133c to a state of being away from the coil 133c. In a case where such a change occurs, the induced electromotive force generated in the coil 133c gradually decreases as the lens 16 moves from the −X side to the +X side, as illustrated in the upper graph of FIG. 16D.

Furthermore, referring to FIG. 16D, in the case where the lens 16 moves from the −Y side to the +Y side, the lens 16 changes from a state of being away from the coil 133c to a state of being close to the coil 133c. In a case where such a change occurs, the induced electromotive force generated in the coil 133c gradually increases as the lens 16 moves from the −Y side to the +Y side, as illustrated in the lower graph of FIG. 16D.

Referring to FIG. 16E, in the case where the lens 16 moves from the −X side to the +X side, the lens 16 changes from a state of being away from the coil 133d to a state of being close to the coil 133d. In a case where such a change occurs, the induced electromotive force generated in the coil 133d gradually increases as the lens 16 moves from the −X side to the +X side, as illustrated in the upper graph of FIG. 16E.

Furthermore, referring to FIG. 16E, in the case where the lens 16 moves from the −Y side to the +Y side, the lens 16 changes from a state of being away from the coil 133d to a state of being close to the coil 133d. In a case where such a change occurs, the induced electromotive force generated in the coil 133d gradually increases as the lens 16 moves from the −Y side to the +Y side, as illustrated in the lower graph of FIG. 16E.

As described above, the magnitude of the induced electromotive forces respectively generated in the coils 133a to 133d differ depending on the positional relationship between the lens 16 and the coils 133a to 133d, so that the positions in the X-axis direction and the Y-axis direction of the lens 16 each can be detected by measuring the induced electromotive forces generated in the coils 133a to 133b.

By using such a relationship, it is possible to detect, by the detection circuit 31, a position B that is a position of the lens 16 after the control is performed for moving the lens 16 to a desired position A by the AF and OIS control unit 53, for example.

Furthermore, in a case where there is a deviation between the desired position A and the detected position B, the deviation can be corrected and the position can be moved to the desired position A. Thus, high-performance lens movement can be implemented.

Fifth Embodiment

Figure 17:
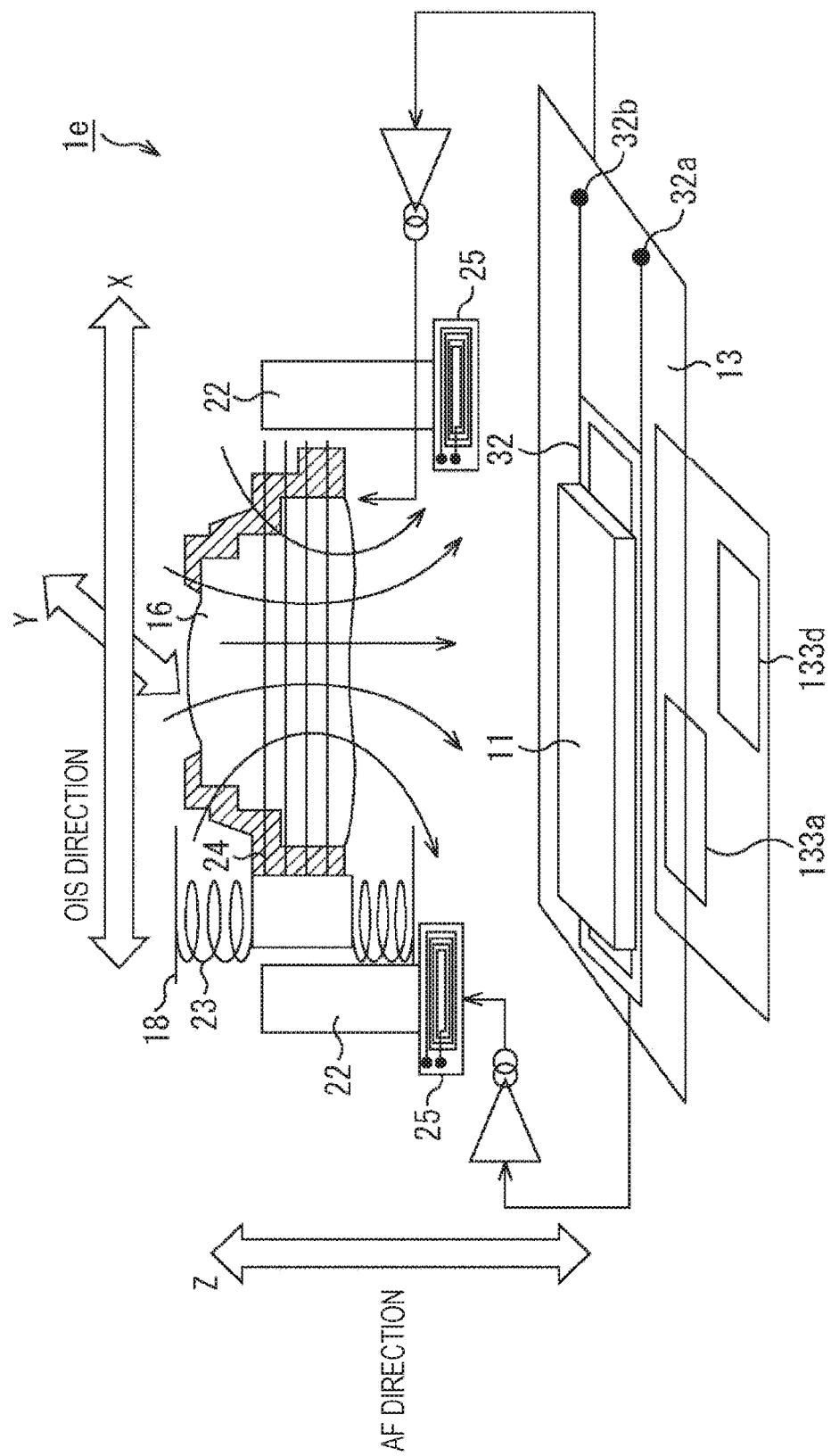
FIG. 17 is a diagram illustrating another configuration example of the imaging device.

A configuration may be adopted including the four coils 133a to 133d as illustrated in FIG. 15; however, a configuration can also be adopted including two coils. FIG. 17 is a diagram illustrating a configuration of an imaging device 1e including two coils 133 for detecting the position of the lens 16 in the XY direction.

The imaging device 1e illustrated in FIG. 17 includes the coil 133a and the coil 133d for detecting the positions in the X-axis direction and the Y-axis direction of the lens 16.

In the case of the imaging device 1e illustrated in FIG. 17, when the induced electromotive force generated in each of the coil 133a and the coil 133d is measured, a measurement result is obtained as illustrated in FIGS. 18A, 18B, and 18C. This is similar to the case described with reference to FIGS. 16B and 16E.

Thus, the position in the X-axis direction and the position in the Y-axis direction of the lens 16 can be detected by measuring the induced electromotive force generated in each of the coils 133a and 133d. This is similar to the case of the imaging device 1d described with reference to FIGS. 15, 16A, 16B, 16C, 16D, and 16E.

Note that, here, the description has been made taking the case where the coil 133a and the coil 133d are included as an example, but a configuration may be adopted where the coil 133b and the coil 133c are included.

As a configuration of the imaging device 1 that detects the position of the XY plane of the lens 16, a configuration including the four coils 133 may be adopted as illustrated in FIG. 15, or a configuration including the two coils 133 may be adopted as illustrated in FIG. 17.

Note that, in the imaging devices 1a to 1e respectively illustrated in FIGS. 2, 9, 12, 15, and 17, the example has been described in which the coil 32 for position detection in the Z-axis for the autofocus is mounted on the circuit board 13; however, a configuration may be adopted in which the coil 32 is mounted in the imaging element 11.

Sixth Embodiment

Figure 19:
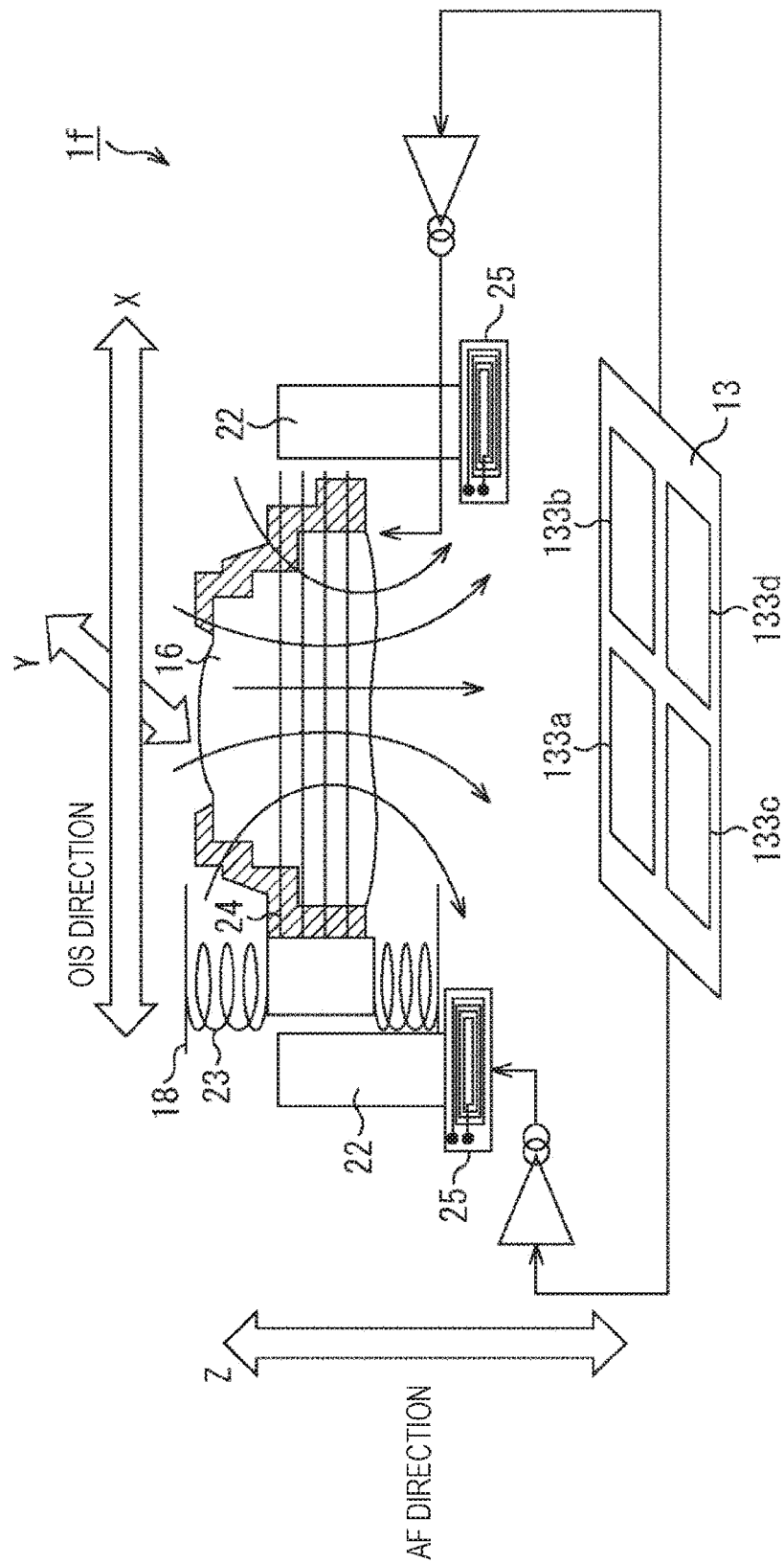
FIG. 19 is a diagram illustrating another configuration example of the imaging device.

As for the imaging devices 1a to 1e described above, the description has been made taking the case where the coil 32 that detects the position in the Z-axis direction and the coils 33 (133) that detect the position in the XY direction are separately provided as an example. FIG. 19 illustrates a configuration example of an imaging device 1f having a configuration in which the coil that detects the position in the Z-axis direction and the coils that detect a position in the XY direction are integrated.

In the imaging device 1f illustrated in FIG. 19, the coils 133a to 133d are provided on the circuit board 13. Note that, although the imaging element 11 is not illustrated in FIG. 19, it is provided on the circuit board 13 as in the other embodiments.

The coils 133a to 133d are the same as the coils 133a to 133d illustrated in FIG. 15, but are different from the coils 133a to 133d illustrated in FIG. 15 in that they are provided on the circuit board 13. Furthermore, the imaging device 1f illustrated in FIG. 19 is different from the imaging device 1d illustrated in FIG. 15 in that a coil corresponding to the coil 32 illustrated in FIG. 15 is not provided.

The induced electromotive forces generated in the coils 133a to 133d illustrated in FIG. 19 change as illustrated in FIGS. 20B, 20C, 20D, and 20E, respectively. FIGS. 20A, 20B, 20C, 20D, and 20E are the same as FIGS. 16A, 16B, 16C, 16D, and 16E, and since the description with reference to FIGS. 16A, 16B, 16C, 16D, and 16E has already been made, the description thereof will be omitted here.

XY position detection of the lens 16 can be performed by measuring the induced electromotive force generated in each of the coils 133a to 133d.

Figure 20:
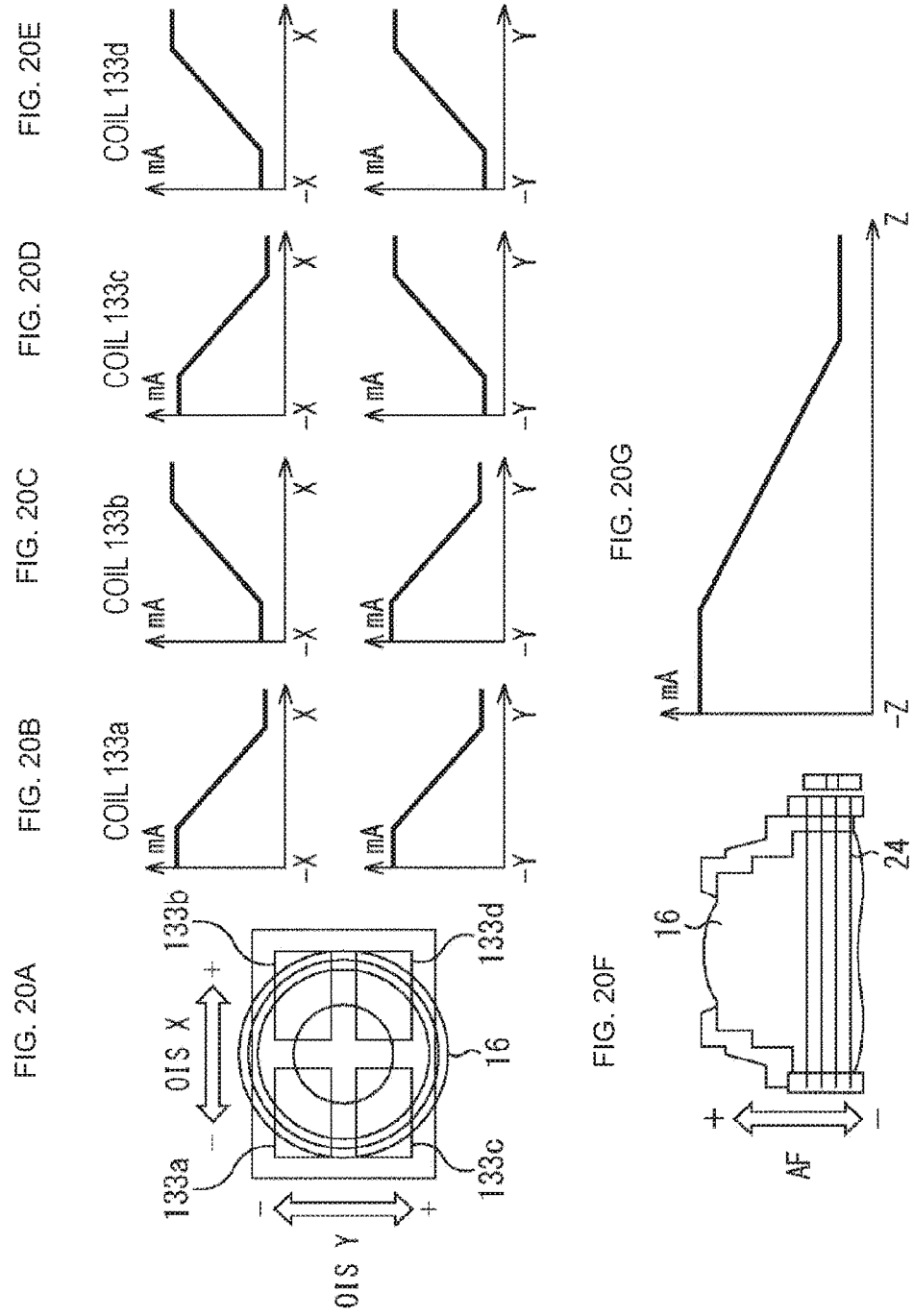
FIGS. 20A, 20B, 20C, 20D, 20E, 20F, and 20G are diagrams for explaining induced electromotive force generated in each coil.

Furthermore, Z position detection of the lens 16 can be performed by measuring the induced electromotive force generated in each of the coils 133a to 133d and integrating the measured values. As illustrated in FIG. 20F, in the lens 16, the upper side in the figure (a direction away from the imaging element 11 not illustrated) is the plus side, and the lower side in the figure (a direction toward the imaging element 11 not illustrated) is the minus side.

FIG. 20G is a diagram illustrating a change in a value obtained by integrating the induced electromotive forces generated in the coils 133a to 133d in a case where the lens 16 (coil 24) moves from the −Z side to the +Z side, in other words, when the lens 16 changes from a state of being close to the coils 133a to 133d to a state of being away from the coils 133a to 133d. This figure is the same as FIG. 7, and the induced electromotive force gradually decreases as the lens 16 (coil 24) moves from the −Z side to the +Z side.

In a case where the lens 16 (coil 24) moves in the Z-axis direction, the lens 16 is away from or close to the coils 133a to 133d, so that the induced electromotive force generated in each of the coils 133a to 133d changes as illustrated in FIG. 20G, and this is the same as the case of the coil 32 of the imaging device 1a (FIG. 2), for example.

As described above, the position in the X-axis direction, the position in the Y-axis direction, and the position in the Z-axis direction of the lens 16 can be detected by measuring the induced electromotive force generated in each of the coils 133a to 133d.

Note that, also in the imaging devices 1a to 1e illustrated in FIGS. 2, 9, 12, 15, and 17, respectively, it is also possible to adopt a configuration in which the coil 32 for position detection in the Z-axis for the autofocus is not provided, and integrating the induced electromotive forces generated in the coils 33 (133) is used as a function as the coil 32 as in the imaging device 1f described with reference to FIGS. 19, 20A, 20B, 20C, 20D, 20E, 20F, and 20G.

For example, the imaging device 1a illustrated in FIG. 2 includes the coil 32 and the coils 33, and the coils 33 can be provided in the spacer 14 as illustrated in FIG. 4, but in a case where the coil 32 is not provided, a configuration can be made in which only the coils 33 provided in the spacer 14 are included in the imaging device 1a.

Seventh Embodiment

In a case where the coil 32 and the coils 33 are provided as in the imaging device 1a illustrated in FIG. 2 and the coils 33 are provided on the spacer 14 as illustrated in FIG. 4, a configuration can be made in which, moreover, the spacer 14 is provided also with the coil 32.

Figure 21:
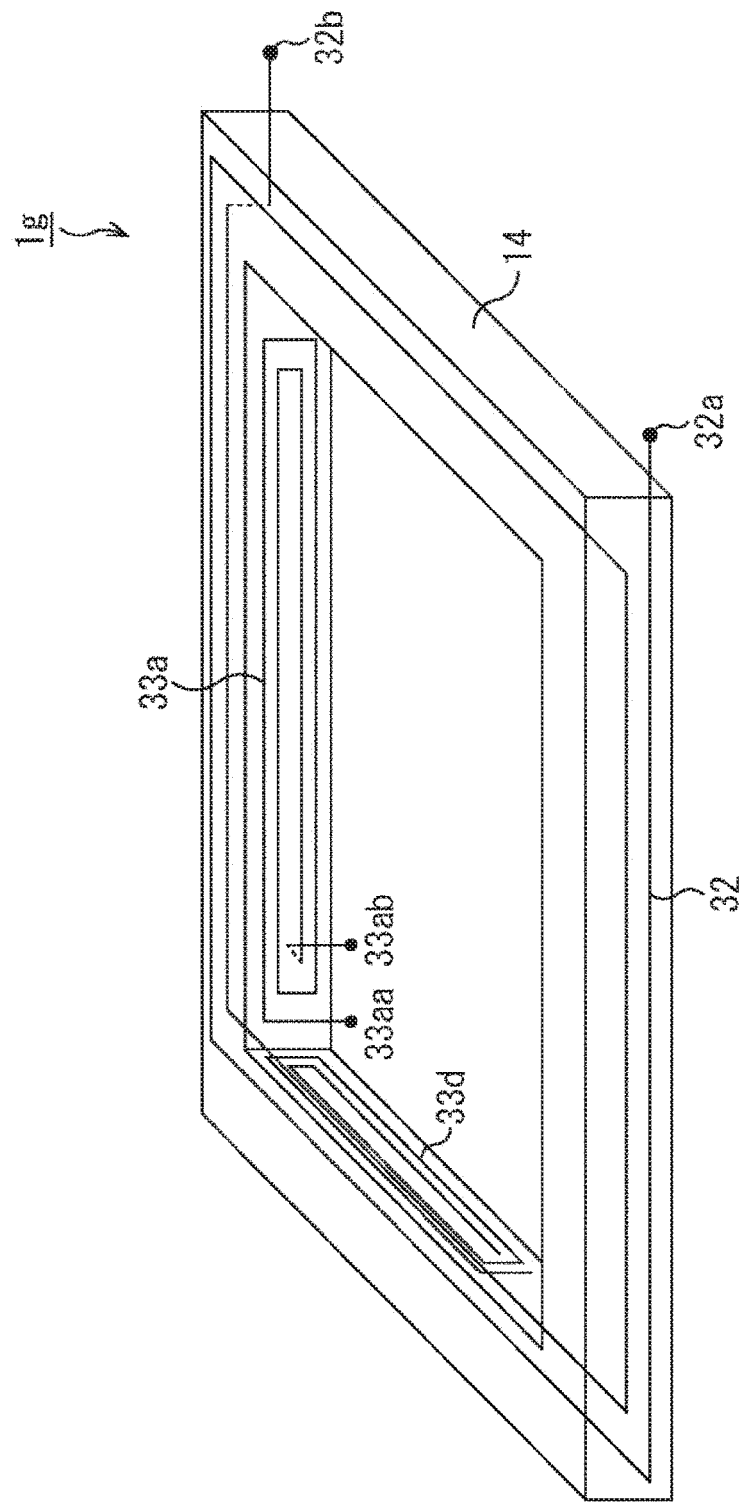
FIG. 21 is a diagram for explaining a case where the coils are formed on the spacer.

As illustrated in FIG. 21, the coil 32 and the coils 33a to 33d are formed on the spacer 14, and a portion in contact with the circuit board 13 of the spacer 14 is formed with a start point 31a and an end point 32b, the start point 33aa and the end point. 33ab, the start point 33ba and the end point 33bb, the start point 33ca and the end point 33cb, and the start point 33da and the end point 33db are formed for connection to the detection circuit 31. Note that, the coil 33b and the coil 33c are not illustrated in FIG. 21. Furthermore, the start point and the end point of those coils 33 are also not illustrated.

The configuration of the imaging device 1 in a case where the coil 32 is formed on the spacer 14 can be the same as that of the imaging device 1a illustrated in FIG. 1, for example. However, it is different in that the coil 32 is not formed on the circuit board 13. Here, although not illustrated, the imaging device 1 including the spacer 14 illustrated in FIG. 21 is described as an imaging device 1g.

Also in the imaging device 1g, the Z position of the lens 16 can be detected as in the case (imaging device 1a) where the coil 32 is provided in the lower side of the imaging element 11 described above. Moreover, in the coils 33, the XY position of the lens 16 can be detected.

Eighth Embodiment

Any of the configurations of the imaging devices 1a to 1g described above has a similar basic configuration, and only the portions in which the coil 32 and the coils 33 are formed and the number thereof are different, and the difference does not affect the configuration of the imaging device 1.

The configuration of the imaging device 1 can be the same regardless of where the coil 32 and the coils 33 are provided or how many are provided. In other words, the present technology can be applied to any configuration of the imaging device 1 without being limited to the configurations of the imaging devices 1a to 1g described above.

Thus, in the following, another configuration of the imaging device 1 will be described. However, the configuration described here is also an example and does not represent a limitation.

Figure 22:
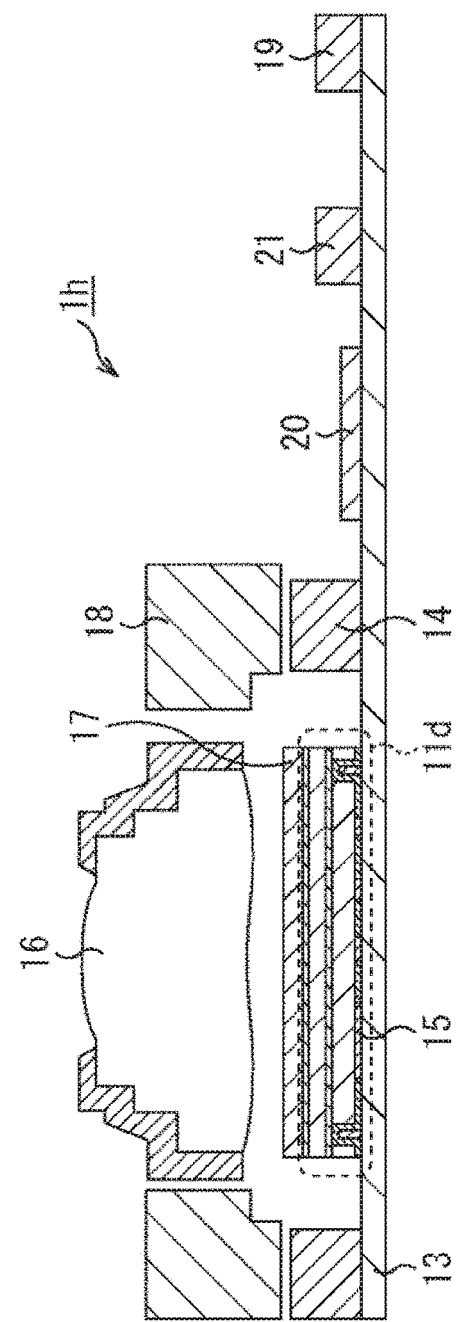
FIG. 22 is a diagram illustrating another configuration example of the imaging device.

FIG. 22 is a diagram illustrating another configuration example of the imaging device 1. An imaging device 1h illustrated in FIG. 22 illustrates a configuration in a case where a Chip size package (CSP) shaped imaging element 11d is applied as the imaging element 11.

Even in the case where the CSP-shaped imaging element 11d is used as the imaging element 11, the coil 32 and the coils 33 (133) can be formed on the circuit board 13, the spacer 14, or the like, and a structure can be made that detects the position of the lens 16.

Ninth Embodiment

Figure 23:
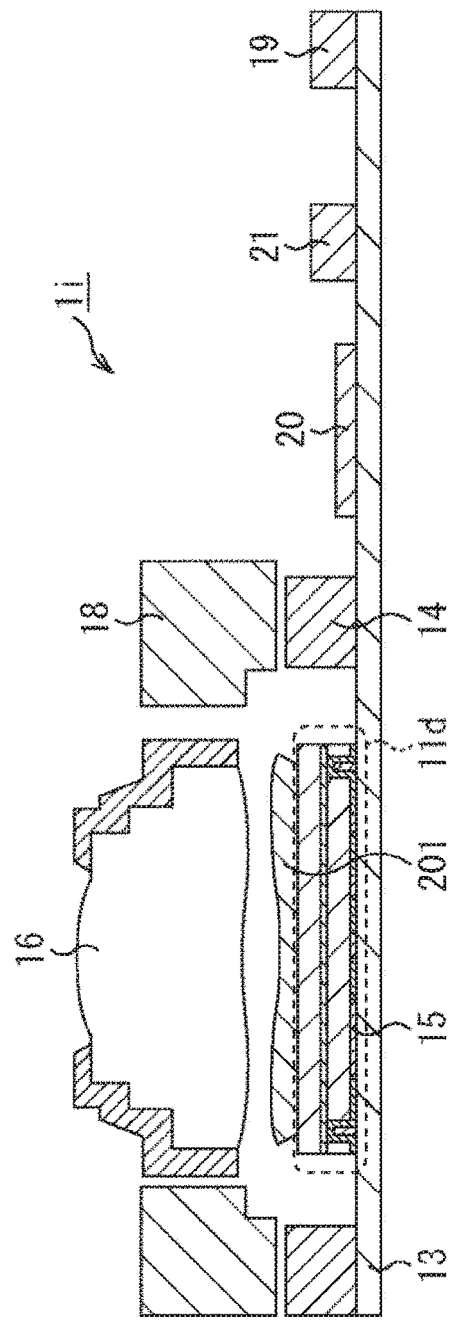
FIG. 23 is a diagram illustrating another configuration example of the imaging device.

FIG. 23 is a diagram illustrating another configuration example of the imaging device 1. An imaging device 1i illustrated in FIG. 23 illustrates a configuration in the case where the CSP-shaped imaging element 11d is applied as the imaging element 11 as in the imaging device 1h illustrated in FIG. 22.

Moreover, the imaging device 1i illustrated in FIG. 23 has a function (filter) of cutting infrared rays in a glass substrate of the CSP-shaped imaging element 11d, and a lens 201 is formed on the glass substrate.

As described above, by providing the glass substrate of the imaging element 11d with the function of cutting infrared rays, the thickness of an infrared cut filter can be reduced. Thus, it is possible to reduce the height of the imaging device 1i.

Furthermore, the lens 201 is formed on the glass substrate, in other words, a lens at the lowermost layer of a plurality of lenses constituting the lens 16 is molded on the glass substrate of the CSP-shaped imaging element 11d, and a configuration can be made in which further thinning of the imaging device 1*d* can be implemented.

Even for such a thinned imaging device 1*d*, the coil 32 and the coils 33 (133) can be formed on the circuit board 13, the spacer 14, or the like, and the structure can be made that detects the position of the lens 16.

Tenth Embodiment

Figure 24:
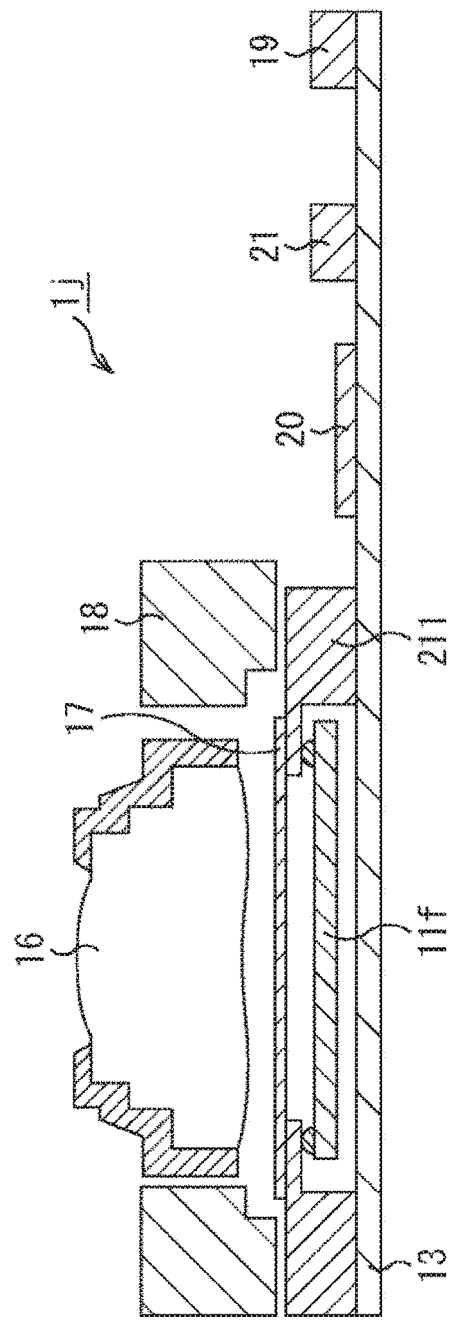
FIG. 24 is a diagram illustrating another configuration example of the imaging device.

FIG. 24 is a diagram illustrating another configuration example of the imaging device 1. An imaging device 1*j* illustrated in FIG. 24 has a structure in which the imaging element 11 (for example, the imaging element 11 of the imaging device 1*a* illustrated in FIG. 1) is an imaging element 11*f* having a flip-chip structure.

In the imaging device 1*j* illustrated in FIG. 24, an electric signal output from the imaging element 11*f* is externally output through a holder 211 having a circuit function. The holder 211 also has a holder function with the actuator 18, and the electric signal from the imaging element 11*f* is externally output through the thin circuit board 13 connected to the holder 211.

Also for such an imaging device 1*j*, the coil 32 and the coils 33 (133) can be formed on the circuit board 13, the spacer (corresponding to the holder 211 in the imaging device 1*j*), or the like, and the structure can be made that detects the position of the lens 16.

Eleventh Embodiment

Figure 25:
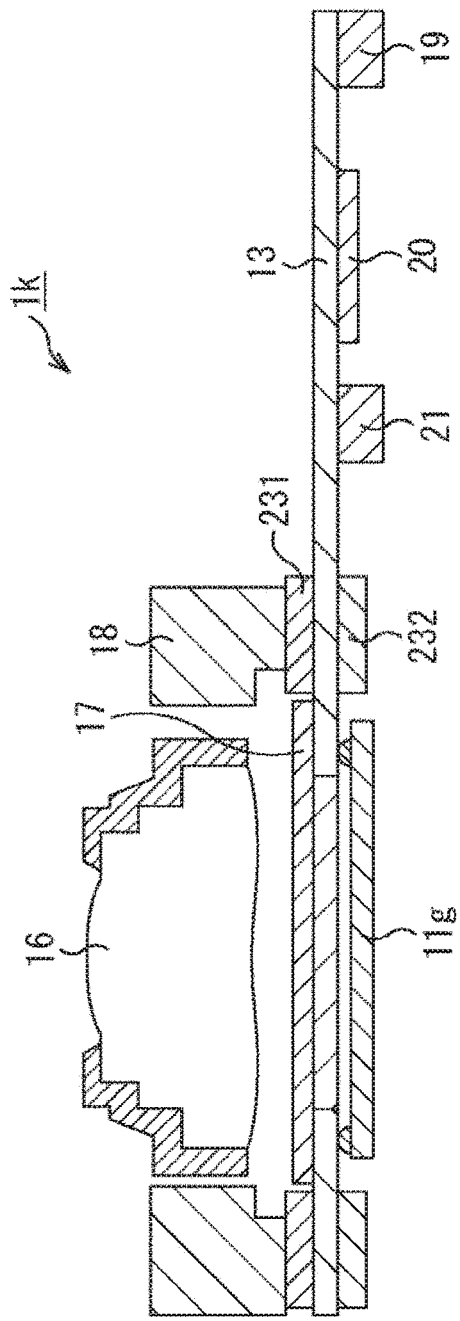
FIG. 25 is a diagram illustrating another configuration example of the imaging device.

FIG. 25 is a diagram illustrating another configuration example of the imaging device 1. An imaging device 1*k* illustrated in FIG. 25 includes an imaging element 11*g* having a flip-chip structure like the imaging element 11*f* of the imaging device 1*j* illustrated in FIG. 24.

The imaging device 1*k* illustrated in FIG. 25 has a structure in which the infrared cut filter 17 serves as a base material when mounted, and the circuit board 13 is bonded to the infrared cut filter 17.

Furthermore, the imaging device 1*k* includes a holder 231 having a circuit function, like the imaging device 1*j* illustrated in FIG. 24. Furthermore, as illustrated in FIG. 25, in a case where the imaging element 11*g* is provided on the lower side of the circuit board 13 (on an opposite side from a side where there is the lens 16), a protective material 232 is also provided for protecting the imaging element 11*g* when the imaging device 1*k* is mounted on a terminal.

Also for such an imaging device 1*h*, the coil 32 and the coils 33 (133) can be formed on the circuit board 13, the spacer (corresponding to the holder 231 or the protective material 232 in the imaging device 1*h*), or the like, and the structure can be made that detects the position of the lens 16.

Twelfth Embodiment

Figure 26:
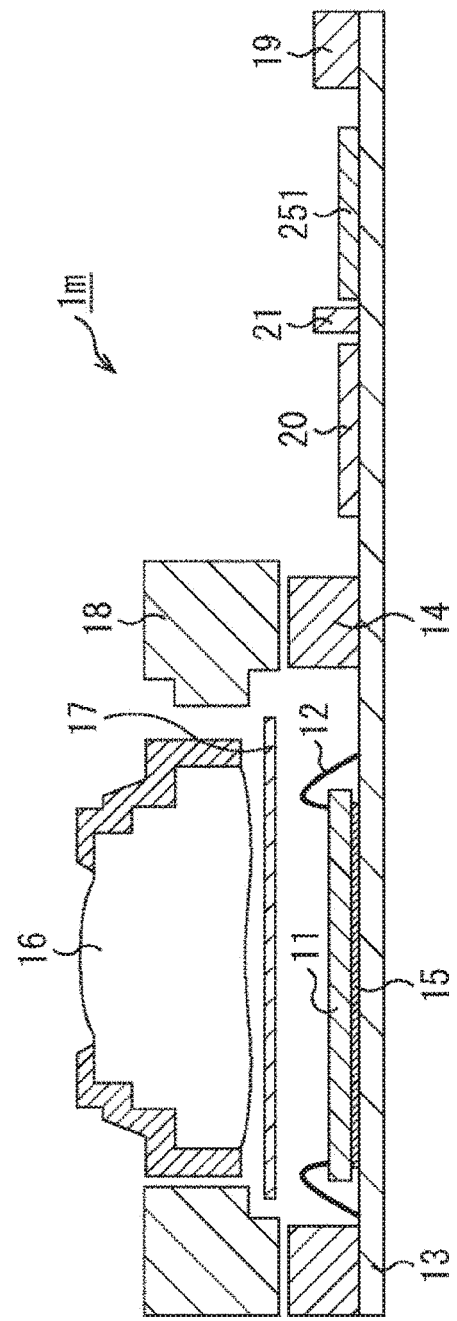
FIG. 26 is a diagram illustrating another configuration example of the imaging device.

FIG. 26 is a diagram illustrating another configuration example of the imaging device 1. An imaging device 1*m* illustrated in FIG. 26 has a configuration similar to the imaging device 1*a* illustrated in FIG. 1, but it is different in that a storage unit 251 is added. The storage unit 251 stores data for correcting variations in the imaging device 1.

Since an amount of induced electromotive force for lens position adjustment changes depending on the number of turns and the size of the coil 24 (FIG. 2) of the actuator 18, a formation state (the number of turns, the number of layers of the formed circuit board 13, and the like) of the coil 32 (FIGS. 3A and 3B) of the circuit board 13, and also a formation state of the coils 33 (FIG. 2) or the coils 133 (FIG. 15), variations of the induced electromotive force are measured at the time of manufacturing the imaging device 1*m*, and adjustment values for adjusting the variations are stored in the storage unit 251.

Then, at the time of actual control, the adjustment values stored in the storage unit 251 are used and processed to correct the variations of the individual imaging devices 1. By doing so, it is possible to perform the position detection and adjustment of the lens 16 in which the variations of the individual imaging devices 1 are improved.

Note that, the storage unit 251 may be mounted on the circuit board 13 as illustrated in FIG. 26, or may be mounted outside the imaging device 1*m*. Furthermore, here, the description has been made taking the imaging device 1*m* obtained by mounting the storage unit 251 on the imaging device 1*a* as an example; however, the storage unit 251 can of course be mounted in the imaging devices 1*b* to 1*k*.

Even for such an imaging device 1*m*, the coil 32 and the coils 33 (133), or only the coils 33 (133) can be formed on the circuit board 13, the spacer 14, or the like, and the structure can be made that detects the position of the lens 16.

According to the present technology, it is possible to reduce power consumption by driving the lens by PWM drive. Furthermore, it is possible to detect the induced electromotive force generated by the magnetic field generated by the actuator (coil inside) that drives the lens when the PWM drive is performed.

Furthermore, the position of the lens can be detected by detecting such induced electromotive force. Moreover, by detecting the position of the lens, it is possible to perform correction in a case where a deviation occurs in the position.

According to the present technology, high performance and downsizing can be implemented by controlling the focus position of the lens of the imaging device.

The imaging device 1 described above can be used for a digital video camera, a digital still camera, or the like. Furthermore, the imaging device 1 described above can be used also for an image input camera such as a monitoring camera or an in-vehicle camera. Furthermore, the imaging device 1 described above can be used also for electronic devices such as a scanner device, a facsimile device, a videophone device, and a mobile terminal device with a camera.

Application Example to Endoscopic Surgical System

The technology according to the present disclosure can be applied to various products. For example, the technology according to the present disclosure may be applied to an endoscopic surgical system.

Figure 27:
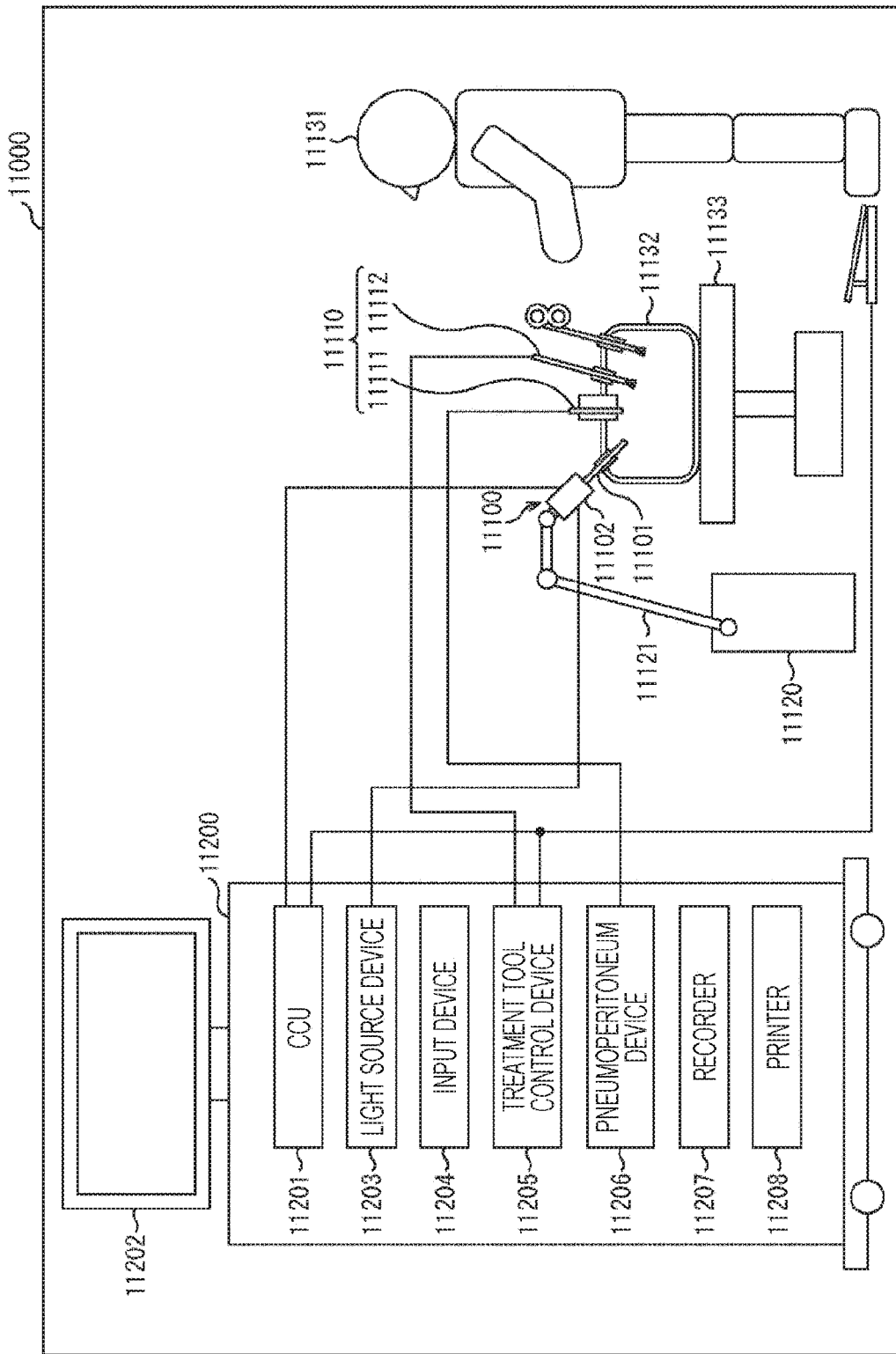
FIG. 27 is a diagram illustrating an example of a schematic configuration of an endoscopic surgical system.

FIG. 27 is a diagram illustrating an example of a schematic configuration of an endoscopic surgical system to which the technology according to the present disclosure (the present technology) can be applied.

FIG. 27 illustrates a state in which a surgeon (doctor) 11131 is performing surgery on a patient 11132 on a patient bed 11133 using an endoscopic surgical system 11000. As illustrated, the endoscopic surgical system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 in which a region of a predetermined length from the distal end is inserted into the body cavity of the patient 11132, and a camera head 11102 connected to the proximal end of the lens barrel 11101. In the illustrated example, the endoscope 11100 formed as a so-called rigid scope including a rigid lens barrel 11101 is illustrated, but the endoscope 11100 may be formed as a so-called flexible scope including a flexible lens barrel.

At the distal end of the lens barrel 11101, an opening is provided into which an objective lens is fitted. A light source device 11203 is connected to the endoscope 11100, and light generated by the light source device 11203 is guided to the distal end of the lens barrel by a light guide extending inside the lens barrel 11101, and the light is emitted toward an observation target in the body cavity of the patient 11132 via the objective lens. Note that, the endoscope 11100 may be a forward-viewing endoscope, an oblique-viewing endoscope, or a side-viewing endoscope.

An optical system and an imaging element are provided inside the camera head 11102, and reflected light (observation light) from the observation target is focused on the imaging element by the optical system. The observation light is photoelectrically converted by the imaging element, and an electric signal corresponding to the observation light, that is, an image signal corresponding to the observation image is generated. The image signal is transmitted as RAW data to a camera control unit (CCU) 11201.

The CCU 11201 includes a central processing unit (CPU), a graphics processing unit (GPU), and the like, and comprehensively controls operation of the endoscope 11100 and a display device 11202. Moreover, the CCU 11201 receives the image signal from the camera head 11102 and applies various types of image processing to the image signal, for example, development processing (demosaic processing), and the like, for displaying the image based on the image signal.

The display device 11202 displays an image based on the image signal subjected to the image processing by the CCU 11201, by the control from the CCU 11201.

The light source device 11203 includes a light source, for example, a light emitting diode (LED) or the like, and supplies irradiation light for imaging a surgical portion or the like to the endoscope 11100.

An input device 11204 is an input interface to the endoscopic surgical system 11000. A user can input various types of information and instructions to the endoscopic surgical system 11000 via the input device 11204. For example, the user inputs an instruction or the like to change imaging conditions (type of irradiation light, magnification, focal length, and the like) for the endoscope 11100.

A treatment tool control device 11205 controls drive of the energy treatment tool 11112 for cauterization of tissue, incision, sealing of blood vessels, or the like. A pneumoperitoneum device 11206 injects a gas into the body cavity of the patient 11132 via the pneumoperitoneum tube 11111 to inflate the body cavity, for the purpose of ensuring a field of view by the endoscope 11100 and ensuring a working space of the surgeon. A recorder 11207 is a device capable of recording various types of information regarding surgery. A printer 11208 is a device capable of printing various types of information regarding surgery in various formats such as text, image, graph, and the like.

Note that, the light source device 11203 that supplies irradiation light for imaging a surgical portion to the endoscope 11100 can include a white light source including, for example, an LED, a laser light source, or a combination thereof. In a case where the white light source includes a combination of R, G, and B laser light sources, the output intensity and the output timing of each color (each wavelength) can be controlled with high accuracy, so that adjustment can be performed of the white balance of the captured image in the light source device 11203. Furthermore, in this case, it is also possible to capture an image corresponding to each of R, G, and B in time division by emitting the laser light from each of the R, G, and B laser light sources in time division to the observation target, and controlling drive of the imaging element of the camera head 11102 in synchronization with the emission timing. According to this method, a color image can be obtained without providing a color filter in the imaging element.

Furthermore, drive of the light source device 11203 may be controlled such that the intensity of light to be output is changed at predetermined time intervals. By controlling the drive of the imaging element of the camera head 11102 in synchronization with the change timing of the light intensity to acquire images in time division, and synthesizing the images, a high dynamic range image can be generated without so-called blocked up shadows or blown out highlights.

Furthermore, the light source device 11203 may be able to supply light of a predetermined wavelength band corresponding to special light observation. In the special light observation, for example, by using wavelength dependence of light absorption in a body tissue, by emitting narrow band light compared to irradiation light (in other words, white light) at the time of ordinary observation, so-called narrow band imaging is performed in which a predetermined tissue such as a blood vessel in a mucosal surface layer is imaged with high contrast. Alternatively, in the special light observation, fluorescence observation may be performed that obtain an image by fluorescence generated by emitting excitation light. In the fluorescence observation, it is possible to irradiate a body tissue with excitation light to observe the fluorescence from the body tissue (autofluorescence observation), or to locally inject a reagent such as indocyanine green (ICG) into a body tissue and irradiate the body tissue with excitation light corresponding to the fluorescence wavelength of the reagent to obtain a fluorescent image, for example. The light source device 11203 may be able to supply narrow band light and/or excitation light corresponding to such special light observation.

Figure 28:
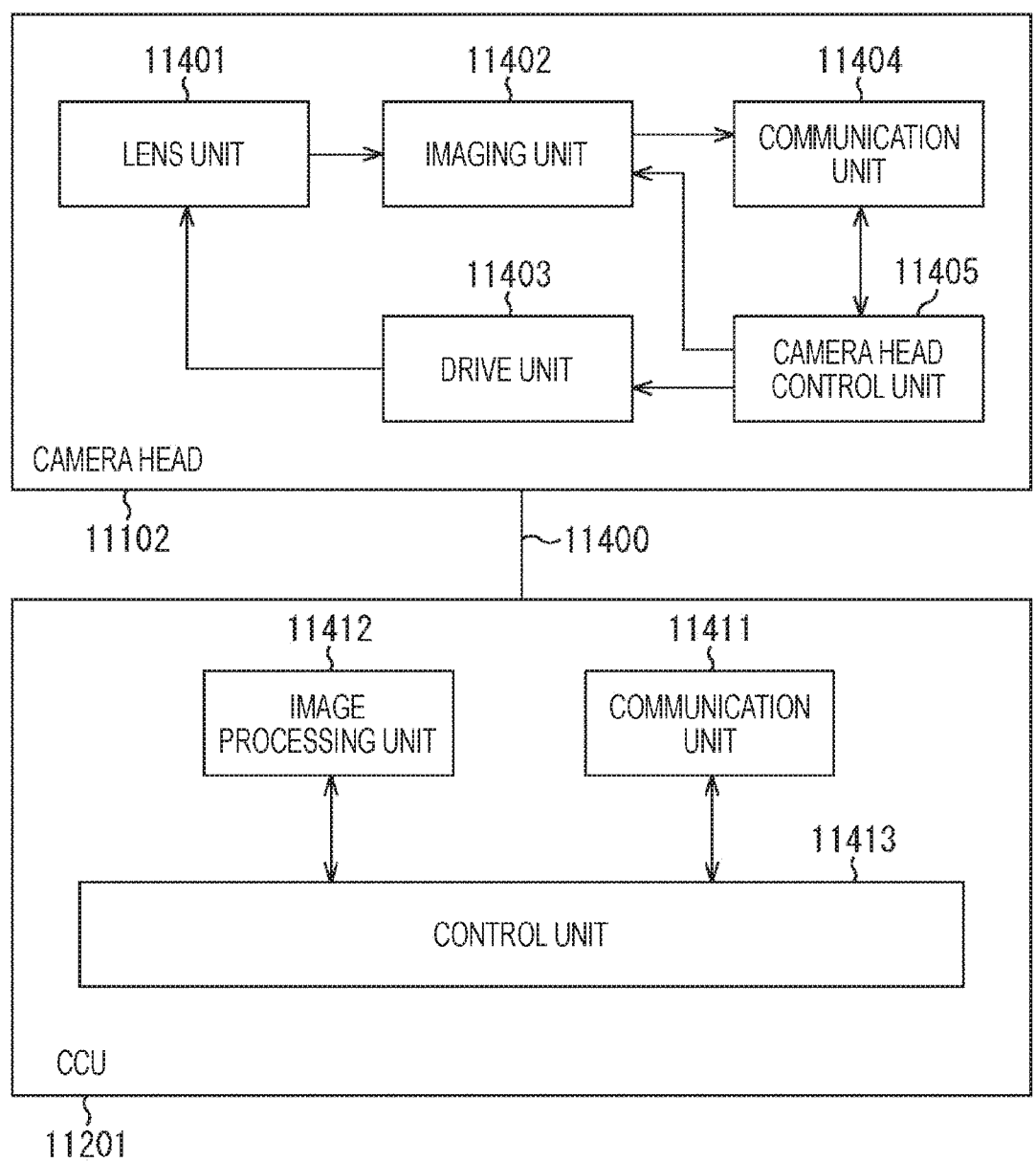
FIG. 28 is a block diagram illustrating an example of a functional configuration of a camera head and a CCU.

FIG. 28 is a block diagram illustrating an example of a functional configuration of the camera head 11102 and the CCU 11201 illustrated in FIG. 27.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. The observation light taken in from the distal end of the lens barrel 11101 is guided to the camera head 11102 and is incident on the lens unit 11401. The lens unit 11401 includes a combination of a plurality of lenses including a zoom lens and a focus lens.

The imaging unit 11402 includes an imaging element. The imaging element constituting the imaging unit 11402 may be one (so-called single-chip) element, or a plurality of (so-called multi-chip) elements. In a case where the imaging unit 11402 includes the multi-chip type, for example, image signals corresponding to R, G, and B are generated by respective imaging elements, and the image signals are synthesized, whereby a color image may be obtained. Alternatively, the imaging unit 11402 may include a pair of imaging elements for acquiring right-eye and left-eye image signals corresponding to three-dimensional (3D) display. The 3D display is performed, whereby the surgeon 11131 can grasp the depth of living tissue in a surgical portion more accurately. Note that, in a case where the imaging unit 11402 includes the multi-chip type, a plurality of systems of the lens units 11401 can be provided corresponding to respective imaging elements.

Furthermore, the imaging unit 11402 is not necessarily provided in the camera head 11102. For example, the imaging unit 11402 may be provided inside the lens barrel 11101 immediately after the objective lens.

The drive unit 11403 includes an actuator and moves the zoom lens and the focus lens of the lens unit 11401 by a predetermined distance along the optical axis by control of the camera head control unit 11405. As a result, the magnification and the focus of the captured image by the imaging unit 11402 can be appropriately adjusted.

The communication unit 11404 includes a communication device for transmitting/receiving various types of information to/from the CCU 11201. The communication unit 11404 transmits the image signal obtained from the imaging unit 11402 as RAW data to the CCU 11201 via the transmission cable 11400.

Furthermore, the communication unit 11404 receives a control signal for controlling drive of the camera head 11102 from the CCU 11201, and supplies the control signal to the camera head control unit 11405. The control signal includes information regarding imaging conditions, for example, information that specifies the frame rate of the captured image, information that specifies the exposure value at the time of imaging, and/or information that specifies the magnification and focus of the captured image.

Note that, the above-described imaging conditions such as the frame rate, exposure value, magnification, and focus may be appropriately specified by the user, or automatically set by the control unit 11413 of the CCU 11201 on the basis of the acquired image signal. In the latter case, a so-called auto exposure (AE) function, auto-focus (AF) function, and auto white balance (AWB) function are installed in the endoscope 11100.

The camera head control unit 11405 controls the drive of the camera head 11102 on the basis of the control signal from the CCU 11201 received via the communication unit 11404.

The communication unit 11411 includes a communication device for transmitting/receiving various types of information to/from the camera head 11102. The communication unit 11411 receives the image signal transmitted from the camera head 11102 via the transmission cable 11400.

Furthermore, the communication unit 11411 transmits the control signal for controlling the drive of the camera head 11102 to the camera head 11102. The image signal and the control signal can be transmitted by electrical communication, optical communication, or the like.

The image processing unit 11412 performs various types of image processing on the image signal that is RAW data transmitted from the camera head 11102.

The control unit 11413 performs various types of control related to imaging of a surgical portion or the like by the endoscope 11100 and display of the captured image obtained by the imaging of the surgical portion or the like. For example, the control unit 11413 generates the control signal for controlling the drive of the camera head 11102.

Furthermore, the control unit 11413 causes the display device 11202 to display the captured image of the surgical portion or the like on the basis of the image signal subjected to the image processing by the image processing unit 11412. At this time, the control unit 11413 may recognize various objects in the captured image by using various image recognition technologies. For example, the control unit 11413 detects color, a shape of an edge, and the like of the object included in the captured image, thereby being able to recognize a surgical tool such as a forceps, a specific body part, bleeding, mist at the time of using the energy treatment tool 11112, or the like. When causing the display device 11202 to display the captured image, the control unit 11413 may cause the display device 11202 to superimpose and display various types of surgery assistance information on the image of the surgical portion by using the recognition result. The surgery assistance information is superimposed and displayed, and presented to the surgeon 11131, whereby the burden on the surgeon 11131 can be reduced, and the surgeon 11131 can reliably perform surgery.

The transmission cable 11400 connecting the camera head 11102 and the CCU 11201 together is an electric signal cable adaptable to communication of electric signals, an optical fiber adaptable to optical communication, or a composite cable thereof.

Here, in the illustrated example, communication is performed by wire using the transmission cable 11400, but communication between the camera head 11102 and the CCU 11201 may be performed wirelessly.

Note that, the endoscopic surgical system has been described as an example here; however, the technology according to the present disclosure may be applied to others, for example, a microscopic surgical system, and the like.

Application Example to Mobile Body

The technology according to the present disclosure can be applied to various products. The technology according to the present disclosure may be implemented as a device mounted on any type of mobile body, for example, a car, an electric car, a hybrid electric car, a motorcycle, a bicycle, a personal mobility, an airplane, a drone, a ship, a robot, or the like.

Figure 29:
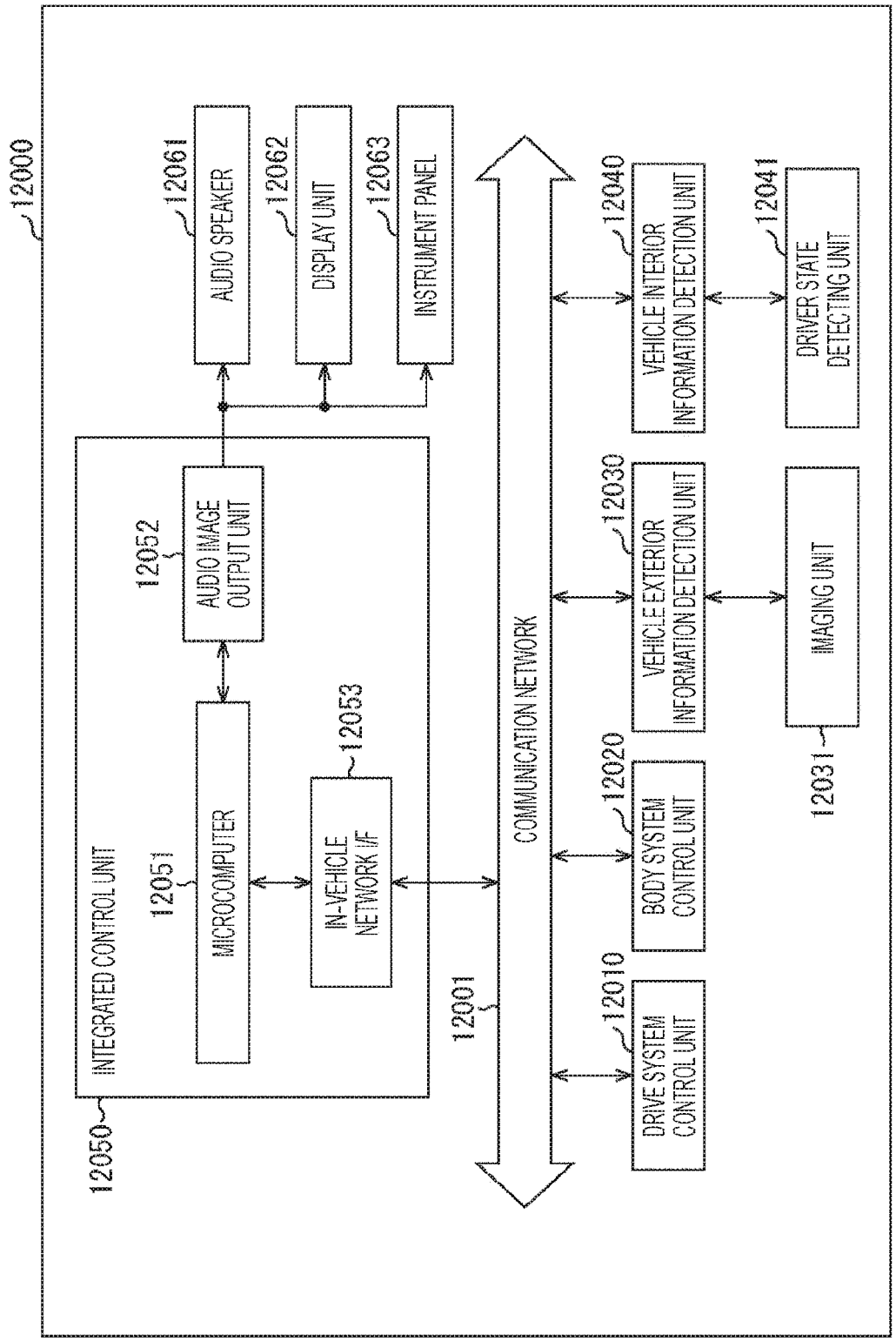
FIG. 29 is a block diagram illustrating an example of a schematic configuration of a vehicle control system.

FIG. 29 is a block diagram illustrating a schematic configuration example of a vehicle control system that is an example of a mobile body control system to which the technology according to the present disclosure can be applied.

The vehicle control system 12000 includes a plurality of electronic control units connected to each other via a communication network 12001. In the example illustrated in FIG. 29, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, an audio image output unit 12052, and an in-vehicle network interface (I/F) 12053 are illustrated.

The drive system control unit 12010 controls operation of devices related to a drive system of a vehicle in accordance with various programs. For example, the drive system control unit 12010 functions as a control device of a driving force generating device for generating driving force of the vehicle, such as an internal combustion engine or a driving motor, a driving force transmitting mechanism for transmitting driving force to wheels, a steering mechanism for adjusting a steering angle of the vehicle, a braking device for generating braking force of the vehicle, and the like.

The body system control unit 12020 controls operation of various devices equipped on the vehicle body in accordance with various programs. For example, the body system control unit 12020 functions as a control device of a keyless entry system, a smart key system, a power window device, or various lamps such as a head lamp, a back lamp, a brake lamp, a turn signal lamp, and a fog lamp. In this case, to the body system control unit 12020, a radio wave transmitted from a portable device that substitutes for a key, or signals of various switches can be input. The body system control unit 12020 accepts input of these radio waves or signals and controls a door lock device, power window device, lamp, and the like of the vehicle.

The vehicle exterior information detection unit 12030 detects information on the outside of the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image outside the vehicle and receives the image captured. The vehicle exterior information detection unit 12030 may perform object detection processing or distance detection processing on a person, a car, an obstacle, a sign, a character on a road surface, or the like, on the basis of the received image.

The imaging unit 12031 is an optical sensor that receives light and outputs an electric signal depending on an amount of light received. The imaging unit 12031 can output the electric signal as an image, or as distance measurement information. Furthermore, the light received by the imaging unit 12031 may be visible light, or invisible light such as infrared rays.

The vehicle interior information detection unit 12040 detects information on the inside of the vehicle. The vehicle interior information detection unit 12040 is connected to, for example, a driver state detecting unit 12041 that detects a state of a driver. The driver state detecting unit 12041 includes, for example, a camera that captures an image of the driver, and the vehicle interior information detection unit 12040 may calculate a degree of fatigue or a degree of concentration of the driver, or determine whether or not the driver is dozing, on the basis of the detection information input from the driver state detecting unit 12041.

The microcomputer 12051 can calculate a control target value of the driving force generating device, the steering mechanism, or the braking device on the basis of the information on the inside and outside of the vehicle acquired by the vehicle exterior information detection unit 12030 or the vehicle interior information detection unit 12040, and output a control command to the drive system control unit 12010. For example, the microcomputer 12051 can perform cooperative control aiming for implementing functions of advanced driver assistance system (ADAS) including collision avoidance or shock mitigation of the vehicle, follow-up traveling based on an inter-vehicle distance, vehicle speed maintaining traveling, vehicle collision warning, vehicle lane departure warning, or the like.

Furthermore, the microcomputer 12051 can perform cooperative control aiming for automatic driving that autonomously travels without depending on operation of the driver, or the like, by controlling the driving force generating device, the steering mechanism, the braking device, or the like on the basis of information on the periphery of the vehicle acquired by the vehicle exterior information detection unit 12030 or the vehicle interior information detection unit 12040.

Furthermore, the microcomputer 12051 can output a control command to the body system control unit 12020 on the basis of information on the outside of the vehicle acquired by the vehicle exterior information detection unit 12030. For example, the microcomputer 12051 can perform cooperative control aiming for preventing dazzling such as switching from the high beam to the low beam, by controlling the head lamp depending on a position of a preceding vehicle or an oncoming vehicle detected by the vehicle exterior information detection unit 12030.

The audio image output unit 12052 transmits at least one of audio or image output signals to an output device capable of visually or aurally notifying an occupant in the vehicle or the outside of the vehicle of information. In the example of FIG. 29, as the output device, an audio speaker 12061, a display unit 12062, and an instrument panel 12063 are illustrated. The display unit 12062 may include, for example, at least one of an on-board display or a head-up display.

Figure 30:
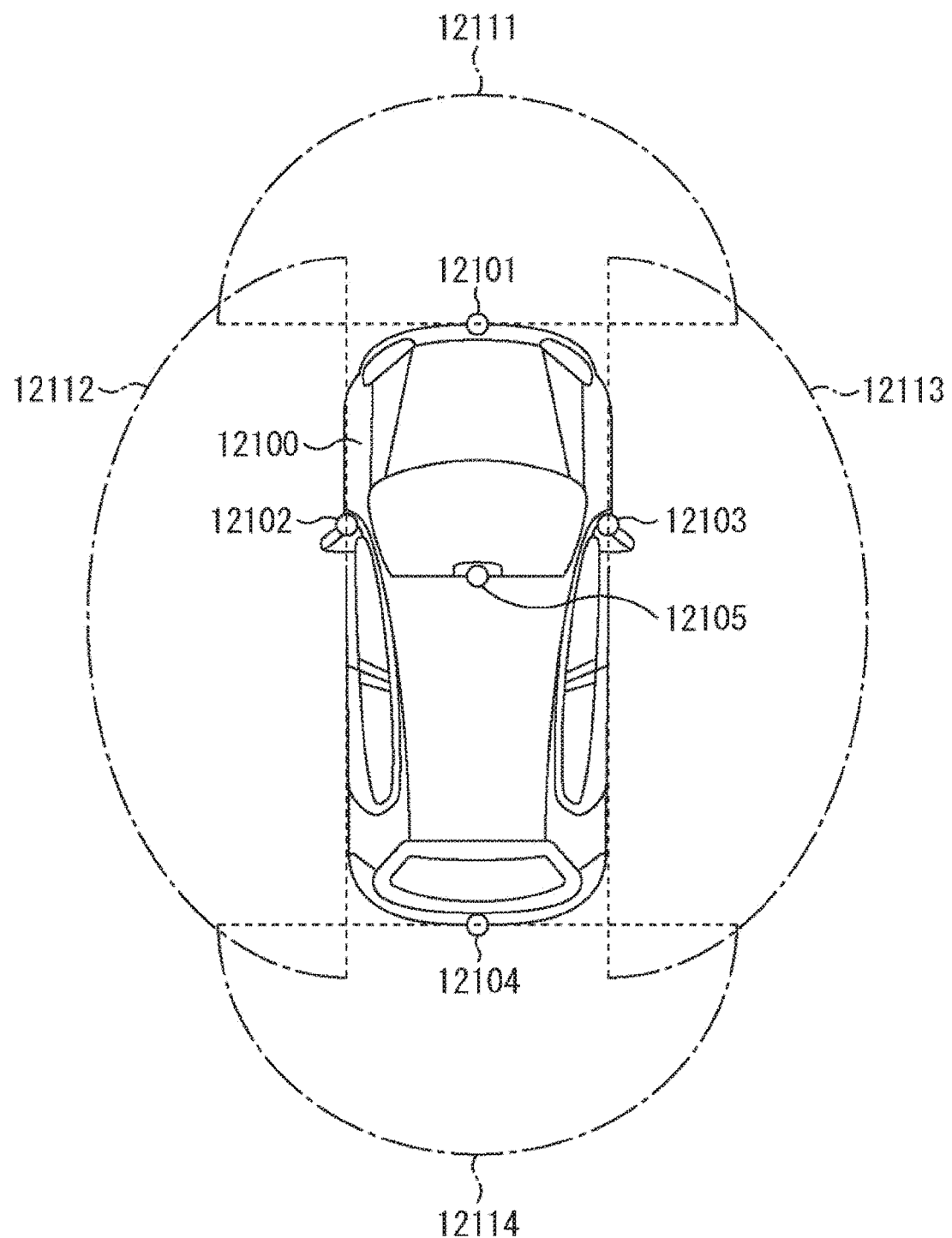
FIG. 30 is an explanatory diagram illustrating an example of installation positions of a vehicle exterior information detecting unit and an imaging unit.

FIG. 30 is a diagram illustrating an example of installation positions of the imaging unit 12031.

In FIG. 30, a vehicle 12100 includes imaging units 12101, 12102, 12103, 12104, and 12105 as the imaging unit 12031.

The imaging units 12101, 12102, 12103, 12104, and 12105 are provided, for example, at a position of the front nose, the side mirror, the rear bumper, the back door, the upper part of the windshield in the vehicle interior, or the like, of a vehicle 12100. The imaging unit 12101 provided at the front nose and the imaging unit 12105 provided at the upper part of the windshield in the vehicle interior mainly acquire images ahead of the vehicle 12100. The imaging units 12102 and 12103 provided at the side mirrors mainly acquire images on the sides of the vehicle 12100. The imaging unit 12104 provided at the rear bumper or the back door mainly acquires an image behind the vehicle 12100. The front images acquired by the imaging units 12101 and 12105 are mainly used for detection of a preceding vehicle, a pedestrian, an obstacle, a traffic signal, a traffic sign, a lane, or the like.

Note that, FIG. 30 illustrates an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, an imaging range 12114 indicates an imaging range of the imaging unit 12104 provided at the rear bumper or the back door. For example, image data captured by the imaging units 12101 to 12104 are superimposed on each other, whereby an overhead image is obtained of the vehicle 12100 viewed from above.

At least one of the imaging units 12101 to 12104 may have a function of acquiring distance information. For example, at least one of the imaging units 12101 to 12104 may be a stereo camera including a plurality of imaging elements, or may be an imaging element including pixels for phase difference detection.

For example, on the basis of the distance information obtained from the imaging units 12101 to 12104, the microcomputer 12051 obtains a distance to each three-dimensional object within the imaging ranges 12111 to 12114, and a temporal change of the distance (relative speed to the vehicle 12100), thereby being able to extract, as a preceding vehicle, a three-dimensional object that is in particular a closest three-dimensional object on a traveling path of the vehicle 12100 and traveling at a predetermined speed (for example, greater than or equal to 0 km/h) in substantially the same direction as that of the vehicle 12100. Moreover, the microcomputer 12051 can set an inter-vehicle distance to be ensured in advance in front of the preceding vehicle, and can perform automatic brake control (including follow-up stop control), automatic acceleration control (including follow-up start control), and the like. As described above, it is possible to perform cooperative control aiming for automatic driving that autonomously travels without depending on operation of the driver, or the like.

For example, on the basis of the distance information obtained from the imaging units 12101 to 12104, the microcomputer 12051 can extract three-dimensional object data regarding the three-dimensional object by classifying the objects into a two-wheeled vehicle, a regular vehicle, a large vehicle, a pedestrian, and other three-dimensional objects such as a utility pole, and use the data for automatic avoidance of obstacles. For example, the microcomputer 12051 identifies obstacles in the periphery of the vehicle 12100 into an obstacle visually recognizable to the driver of the vehicle 12100 and an obstacle difficult to be visually recognized. Then, the microcomputer 12051 determines a collision risk indicating a risk of collision with each obstacle, and when the collision risk is greater than or equal to a set value and there is a possibility of collision, the microcomputer 12051 outputs an alarm to the driver via the audio speaker 12061 and the display unit 12062, or performs forced deceleration or avoidance steering via the drive system control unit 12010, thereby being able to perform driving assistance for collision avoidance.

At least one of the imaging units 12101 to 12104 may be an infrared camera that detects infrared rays. For example, the microcomputer 12051 can recognize a pedestrian by determining whether or not a pedestrian exists in the captured images of the imaging units 12101 to 12104. Such pedestrian recognition is performed by, for example, a procedure of extracting feature points in the captured images of the imaging units 12101 to 12104 as infrared cameras, and a procedure of performing pattern matching processing on a series of feature points indicating a contour of an object to determine whether or not the object is a pedestrian. When the microcomputer 12051 determines that a pedestrian exists in the captured images of the imaging units 12101 to 12104 and recognizes the pedestrian, the audio image output unit 12052 controls the display unit 12062 so that a rectangular contour line for emphasis is superimposed and displayed on the recognized pedestrian. Furthermore, the audio image output unit 12052 may control the display unit 12062 so that an icon or the like indicating the pedestrian is displayed at a desired position.

In the present specification, the system represents an entire device including a plurality of devices.

Note that, the advantageous effects described in this specification are merely examples, and the advantageous effects of the present technology are not limited to them and may include other effects.

Note that, the embodiment of the present technology is not limited to the embodiments described above, and various modifications are possible without departing from the scope of the present technology.

Note that, the present technology can also be configured as described below.

(1)
An imaging device including:
a lens that focuses subject light;
an imaging element that photoelectrically converts the subject light from the lens;
a circuit substrate including a circuit that externally outputs a signal from the imaging element;
an actuator that drives the lens with a Pulse Width Modulation (PWM) waveform in at least one of an X-axis direction, a Y-axis direction, or a Z-axis direction; and
a detection unit that detects a magnetic field generated by a coil included in the actuator.

(2)
The imaging device according to (1), in which
the actuator drives the lens to move a focus, or drives the lens to reduce an influence of camera shake.

(3)
The imaging device according to (2), in which
the Z-axis direction is a direction for moving the focus, and the X-axis direction and the Y-axis direction are directions for reducing the influence of the camera shake.

(4)
The imaging device according to any of (1) to (3), in which
the detection unit detects induced electromotive force generated by the magnetic field.

(5)
The imaging device according to (4), in which
the detection unit detects a position of the lens from the induced electromotive force.

(6)
The imaging device according to (5), in which
the detection unit includes
a first coil that detects a position in the X-axis direction and a position in the Y-axis direction of the lens, and
a second coil that detects a position in the Z-axis direction of the lens.

(7)
The imaging device according to (6), in which
a plurality of the first coils is provided on different two surfaces or four surfaces, respectively, the surfaces being perpendicular to an imaging surface of the imaging element.

(8)
The imaging device according to (6), in which
two or four of the first coils are provided on a surface horizontal to an imaging surface of the imaging element.

(9)
The imaging device according to (6), in which
the first coil is provided on the circuit substrate.

(10)
The imaging device according to (6), in which
the first coil is provided in a lower layer than the circuit substrate, and
the second coil is provided on the circuit substrate.

(11)
The imaging device according to (6), further including
a spacer that fixes the imaging element and the circuit substrate, in which
the first coil is provided on the spacer, and
the second coil is provided on the circuit substrate.

(12)
The imaging device according to (6), further including
a spacer that fixes the imaging element and the circuit substrate, in which
the first coil and the second coil are provided on the spacer.

(13)
The imaging device according to any of (1) to (12), in which the detection unit includes a coil that detects a position in the X-axis direction, a position in the Y-axis direction, and a position in the Z-axis direction of the lens.

(14)

The imaging device according to any of (1) to (13), in which the detection unit detects a tilt of the lens.

(15)

An electronic device including an imaging device that includes:

a lens that focuses subject light;

an imaging element that photoelectrically converts the subject light from the lens;

a circuit substrate including a circuit that externally outputs a signal from the imaging element;

an actuator that drives the lens with a Pulse Width Modulation (PWM) waveform in at least one of an X-axis direction, a Y-axis direction, or a Z-axis direction; and a detection unit that detects a magnetic field generated by a coil included in the actuator.

REFERENCE SIGNS LIST

1 Imaging device
11 Imaging element
12 Metal wire
13 Circuit board
14 Spacer
15 Adhesive
16 Lens
17 Infrared cut filter
18 Actuator
19 Connector
20 Autofocus driver
31 Detection circuit
32 Coil
33 Coil
51 Amplification unit
52 A/D conversion unit
53 AF control unit
54 Control unit
133 Coil

The invention claimed is:

1. An imaging device, comprising:
a lens configured to focus subject light;
an imaging element configured to photoelectrically convert the subject light from the lens;
a circuit substrate including a circuit configured to externally output a signal from the imaging element;
an actuator configured to drive the lens in at least one of an X-axis direction, a Y-axis direction, or a Z-axis direction based on a Pulse Width Modulation (PWM) waveform drive signal, wherein
the actuator includes a first coil configured to generate a magnetic field based on the PWM waveform drive signal; and
a detection circuit that comprises:
a second coil in a direction perpendicular to a direction of the magnetic field generated by the first coil based on the PWM waveform drive signal, wherein the second coil is configured to:
generate a first induced electromotive force based on the magnetic field generated by the first coil; and
detect a position of the lens in the Z-axis direction based on a magnitude of the first induced electromotive force; and a plurality of third coils at positions horizontal to the direction of the magnetic field generated by the first coil based on the PWM waveform drive signal, wherein the plurality of third coils is configured to:
generate a second induced electromotive force based on the magnetic field generated by the first coil; and
detect a position of the lens in the X-axis direction and a position of the lens in the Y-axis direction based on a magnitude of the second induced electromotive force.

2. The imaging device according to claim 1, wherein the actuator is further configured to:
drive the lens to move a focus, or
drive the lens to reduce an influence of camera shake.

3. The imaging device according to claim 2, wherein
the Z-axis direction is a direction for moving the focus, and
the X-axis direction and the Y-axis direction are directions to reduce the influence of the camera shake.

4. The imaging device according to claim 1, wherein
the plurality of third coils is provided on different two surfaces or four surfaces that are perpendicular to an imaging surface of the imaging element.

5. The imaging device according to claim 1, wherein two coils or four coils of the plurality of third coils are on a surface horizontal to an imaging surface of the imaging element.

6. The imaging device according to claim 1, wherein the first coil plurality of third coils is on the circuit substrate.

7. The imaging device according to claim 1, wherein
the plurality of the third coils is in a lower layer than the circuit substrate, and
the second coil is on the circuit substrate.

8. The imaging device according to claim 1, further comprising a spacer that fixes the imaging element and the circuit substrate, wherein
the plurality of the third coils is on the spacer, and
the second coil is on the circuit substrate.

9. The imaging device according to claim 1, further comprising a spacer that fixes the imaging element and the circuit substrate, wherein
the plurality of the third coils and the second coil are provided on the spacer.

10. The imaging device according to claim 1, wherein the plurality of third coils is further configured to detect a tilt of the lens based on the magnitude of the second induced electromotive force.

11. An electronic device, comprising:
an imaging device that includes:
a lens configured to focus subject light;
an imaging element configured to photoelectrically convert the subject light from the lens;
a circuit substrate including a circuit configured to externally output a signal from the imaging element;
an actuator configured to drive the lens in at least one of an X-axis direction, a Y-axis direction, or a Z-axis direction based on a Pulse Width Modulation (PWM) waveform drive signal, wherein
the actuator includes a first coil configured to generate a magnetic field based on the PWM waveform drive signal; and
a detection circuit that comprises:
a second coil in a direction perpendicular to a direction of the magnetic field generated by the first coil based on the PWM waveform drive signal, wherein the second coil is configured to:

generate a first induced electromotive force based on the magnetic field generated by the first coil; and detect a position of the lens in the Z-axis direction based on a magnitude of the first induced electromotive force; and a plurality of third coils at positions horizontal to the direction of the magnetic field generated by the first coil based on the PWM waveform drive signal, wherein the plurality of third coils is configured to:

generate a second induced electromotive force based on the magnetic field generated by the first coil; and detect a position of the lens in the X-axis direction and a position of the lens in the Y-axis direction based on a magnitude of the second induced electromotive force.

\* \* \* \* \*